US008567209B2

(12) United States Patent
Kim

(10) Patent No.: US 8,567,209 B2
(45) Date of Patent: Oct. 29, 2013

(54) REFRIGERATOR

(75) Inventor: Sung Kyoung Kim, Changwon-si (KR)

(73) Assignee: LG Electronics Inc., Seoul (KR)

(*) Notice: Subject to any disclaimer, the term of this patent is extended or adjusted under 35 U.S.C. 154(b) by 679 days.

(21) Appl. No.: 12/717,038

(22) Filed: Mar. 3, 2010

(65) Prior Publication Data

US 2010/0251745 A1 Oct. 7, 2010

Related U.S. Application Data

(63) Continuation of application No. PCT/KR2008/006497, filed on Nov. 4, 2008.

(30) Foreign Application Priority Data

Nov. 5, 2007 (KR) ........................ 10-2007-0111951

(51) Int. Cl.

| | |
|---|---|
| *F25C 1/00* | (2006.01) |
| *A47F 3/04* | (2006.01) |
| *F25D 23/12* | (2006.01) |
| *F25D 3/00* | (2006.01) |
| *B67D 7/14* | (2010.01) |
| *G01F 11/06* | (2006.01) |
| *G01F 11/00* | (2006.01) |
| *B61G 5/08* | (2006.01) |
| *F16L 35/00* | (2006.01) |
| *F16L 21/00* | (2006.01) |
| *F16L 37/00* | (2006.01) |

(52) U.S. Cl.

USPC .......... 62/347; 62/66; 62/74; 62/250; 62/338; 62/391; 62/392; 62/393; 222/66; 222/250; 222/338; 285/26; 285/29; 285/33; 285/71; 285/232; 285/93; 285/24; 285/308

(58) Field of Classification Search

USPC ........................ 62/390–393, 338, 66, 250, 74

See application file for complete search history.

(56) References Cited

U.S. PATENT DOCUMENTS

| | | | | |
|---|---|---|---|---|
| 4,700,892 | A | 10/1987 | Cunning | |
| 5,813,246 | A * | 9/1998 | Oh | 62/391 |
| 6,971,684 | B2 | 12/2005 | Ferrari | |
| 7,293,846 | B2 * | 11/2007 | Collins et al. | 312/405.1 |

(Continued)

FOREIGN PATENT DOCUMENTS

| | | | |
|---|---|---|---|
| CN | 1153278 A | | 7/1997 |
| CN | 2539113 | * | 3/2003 |

(Continued)

*Primary Examiner* — Frantz Jules
*Assistant Examiner* — Erik Mendoza-Wilkenfel
(74) *Attorney, Agent, or Firm* — Birch, Stewart, Kolasch & Birch, LLP

(57) ABSTRACT

A refrigerator is provided. The refrigerator includes a body defining a storage space; a door selectively shielding the storage space; a container connecting part disposed in the storage space or the door; a water supply container separably coupled to the container connecting part, the water supply container including an opening for injecting water; an ice making device for making ice using the water supplied from the water supply container; a water supply passage fluidly connecting the water supply container to the ice making device, the water supply passage extending in an inside direction of the water supply container; and a pump connected to the water supply passage to supply the water within the water supply container into the ice making device. According to the refrigerator, installation cost is reduced, and quality and reliability are improved.

27 Claims, 24 Drawing Sheets

(56) References Cited

U.S. PATENT DOCUMENTS

| | | | | |
|---|---|---|---|---|
| 2004/0232696 | A1 * | 11/2004 | Andre | 285/319 |
| 2006/0186278 | A1 | 8/2006 | Tjerrild | |
| 2007/0157637 | A1 | 7/2007 | Ferragut, II et al. | |

FOREIGN PATENT DOCUMENTS

| | | | | |
|---|---|---|---|---|
| CN | 2539113 | Y | | 3/2003 |
| JP | 6-11221 | A | | 1/1994 |
| JP | 09-222275 | A | | 8/1997 |
| JP | 11-304323 | A | | 11/1999 |
| JP | 2001-041625 | A | | 2/2001 |
| JP | 2002-295931 | A | | 10/2002 |
| KR | 10-1997-0028324 | A | | 6/1997 |
| KR | 0126939 | U | * | 6/1997 |
| KR | 20-1998-0118117 | U | | 7/1998 |
| KR | 20-0126939 | Y1 | | 11/1998 |
| KR | 10-0180818 | B1 | | 12/1998 |
| KR | 10-0168184 | B | | 1/1999 |
| KR | 10-1999-0034645 | A | | 5/1999 |
| KR | 10-2001-0020786 | A | | 3/2001 |
| KR | 10-2006-0068745 | A | | 6/2006 |

* cited by examiner

REFRIGERATOR

CROSS-REFERENCE TO RELATED APPLICATIONS

The present application is a continuation application under 35 U.S.C. §120 of International Application No. PCT/KR2008/006497, filed Nov. 4, 2008, and claims priority under 35 U.S.C. §119 to Korean Application No. 10-2007-0111951, filed in the Republic of Korea on Nov. 5, 2007, the entire contents of each of which are hereby incorporated by reference into the present application.

FIELD OF THE INVENTION

The present disclosure relates to a refrigerator, and more particularly, to a refrigerator in which a water supply container is disposed therein to supply water into an ice making device and/or a water dispenser without requiring connection to an external water supply pipe.

DESCRIPTION OF THE BACKGROUND ART

In general, a refrigerator is a home appliance that can store foods at low temperatures in an inside storage space shielded by a refrigerating compartment door. In detail, the refrigerator can store the foods at an optimum state by cooling the storage space using cooling air generated through heat exchange with refrigerant changed to low temperature and low pressure conditions in a cooling cycle.

As dietary life changes, the size of the refrigerator tends to increase more and more, and multiple functions are provided to the refrigerator. Accordingly, refrigerators having various structures and convenient devices are brought to the market upon consideration of user requirements.

Representative examples of the convenient devices include an ice making device for making ice and an ice/water dispenser. The ice making device and the dispenser for providing the ice or water to a user may be disposed in the refrigerator and the refrigerating compartment door.

The ice making device generally uses a method in which water is directly filled in a tray for making the ice or a method in which the water is filled in a water supply container having a water capacity for making the ice once, and then the water supply container is fitted to supply the water stored in the water supply container to the tray for making the ice.

However, in such a structure, the ice making device can make ice only once. If the water supply container having a large capacity is used, water within the water supply container is frozen due to the nature of a temperature of a freezing compartment. As a result, it is impossible to continuously perform a proper function of the ice making device.

To solve the above-described limitations, a refrigerator has been developed in which a water supply line is directly connected to a household water pipe to continuously make water available to the ice making device. Also, the water supply is connected to the dispenser to dispense drinking water through the dispenser.

Since the refrigerator having such a structure uses the household water pipe as a water source, the refrigerator must be disposed adjacent to the water pipe, or a relative long water supply line must be provided. As a result, installation costs of the refrigerator increases, and an installation place of the refrigerator is limited.

Korean Granted Patent No. 10-0346975 discloses a refrigerator in which a water supply container is disposed in a refrigerating compartment, and water within the water supply container is guided to an ice tray via a water supply pipe by a pump inside the water supply container. In such a structure, an auxiliary water supply container is disposed in the refrigerating compartment, and the water for making ice is continuously supplied into the ice tray to continuously make the ice without requiring a direct connection to a water pipe.

Korean Laid-open Patent No. 10-2006-0068745 discloses a refrigerator in which a mineral water bottle is seated in an upside-down manner to supply water into a water tank, and the water is dispensed to the outside through a dispenser communicating with the water tank. In such a structure, the water of the bottle disposed in a refrigerating compartment door is dispensed into the dispenser without requiring a direct connection to a water pipe.

BRIEF SUMMARY OF THE INVENTION

Embodiments provide a refrigerator in which an opening of a water supply container is selectively detachably coupled to a container connecting part in a refrigerating compartment or a refrigerating compartment door to supply water into at least an ice making device.

Embodiments also provide a refrigerator in which a water supply container is selectively disposed, a container connecting part disposed in a refrigerating compartment or a refrigerating compartment door, and a water supply passage passes through the container connecting part to supply water into at least an ice making device.

Embodiments also provide a refrigerator in which a water supply container is selectively disposed, and a container connecting part detachably coupled to a refrigerating compartment or a refrigerating compartment door to supply water within the water supply container into at least an ice making device.

Embodiments also provide a refrigerator in which a container connecting part from which a water supply container is detachable is provided in a housing separably disposed in a refrigerating compartment or a refrigerating compartment door to supply water within the water supply container into at least an ice making device.

Embodiments also provide a refrigerator in which a container connecting part from which a water supply container is detachable is detachably provided in a housing separably disposed in a refrigerating compartment or a refrigerating compartment door to supply water within the water supply container into at least an ice making device.

Embodiments also provide a refrigerator in which a water supply container is detached from a container connecting part of a refrigerating compartment or a refrigerating compartment door, and a holder for restricting the water supply container is disposed on the container connecting part to fix the water supply container having various sizes, thereby to supply water into at least an ice making device.

Embodiments also provide a refrigerator in which a main water supply container including a mineral water bottle generally available everywhere or a sub water supply container is selectively disposed in a refrigerating compartment or a refrigerating compartment door to supply water into at least an ice making device.

Embodiments also provide a refrigerator in which a water supply container is detached from a container connecting part of a refrigerating compartment or a refrigerating compartment door, and a water supply is connected to an ice making device via the container connecting part inside the water supply container to supply water into at least an ice making device.

Embodiments also provide a refrigerator in which a water supply container is detached from a container connecting part of a refrigerating compartment or a refrigerating compartment door, and at least portion of a pump is disposed inside the container connecting part to supply water into an ice making device.

In one embodiment, a refrigerator includes: a body in which a refrigerating compartment and a freezing compartment are disposed; a water feeding passage extending toward at least a freezing compartment door; and a water supply unit fluidly connected to the water feeding passage, wherein the water supply unit includes: a connecting passage connected to the water feeding passage; a pump between the water feeding passage and the connecting passage; a water supply container in which an opening for supplying or discharging water is formed, the water supply container being detachably disposed on a refrigerating compartment door; a container connecting part to which the opening of the water supply container is coupled upwardly; and a suction passage connected to the connecting passage, the suction passage being inserted into the water supply container.

In another embodiment, a refrigerator includes: a body defining a storage space; a door selectively shielding the storage space; a container connecting part disposed in the storage space or the door; a water supply container separably coupled to the container connecting part, the water supply container including an opening for injecting water; an ice making device for making ice using the water supplied from the water supply container; a water supply passage fluidly connecting the water supply container to the ice making device, the water supply passage extending in an interior of the water supply container; and a pump connected to the water supply passage to supply the water within the water supply container into the ice making device.

In a further embodiment, a refrigerator includes: a body defining a storage space; a door selectively shielding the storage space; a container connecting part separably disposed in the storage space or the door; a water supply container including an opening connected to the container connecting part; an ice making device for making ice using the water supplied from the water supply container; a water supply passage fluidly connected from an inside of the water supply container to the ice making device; and a pump for pumping the water supplied into the water supply passage.

In a still further embodiment, a refrigerator includes: a body defining a refrigerating compartment and a freezing compartment; an ice making device received in the refrigerating compartment or the freezing compartment to generate ice; a water supply container for storing water to be supplied into the ice making device; a water supply passage for guiding water from the water supply container to the ice making device; a pump disposed in the water supply passage to pump the water within the water supply container; a housing separably disposed on one of the refrigerating compartment and a refrigerating compartment door opening and closing the refrigerating compartment; and a container connecting part disposed in the housing, the container connecting part being separably connected to an opening of the water supply container.

In an even further embodiment, a refrigerator includes: a body defining a refrigerating compartment and a freezing compartment; an ice making device received in the refrigerating compartment or the freezing compartment to generate ice; a water supply container for storing water to be supplied into the ice making device; a water supply passage for guiding water from the water supply container to the ice making device; a pump disposed in the water supply passage to pump the water within the water supply container; a housing separably disposed on one of the refrigerating compartment and a refrigerating compartment door opening and closing the refrigerating compartment; and a container connecting part separably disposed in the housing, the container connecting part being connected to an opening of the water supply container.

In a yet further embodiment, a refrigerator includes: a body defining a storage space; a water supply container in which an opening for supplying and discharging water is upwardly disposed, the water supply container for storing water to be supplied into at least an ice making device; a water supply passage fluidly connected to the water supply container and the ice making device; a pump disposed in the water supply passage to pump the water within the water supply container; a container connecting part disposed in the storage space or a door opening and closing the storage space, the container connecting part including a container inserting hole in which the opening of the water supply container is inserted; and a holder disposed in the container connecting part to selectively restrict the opening of the water supply container.

In a yet further embodiment, a refrigerator includes: a body defining a storage space; a door selectively shielding the storage space; a water supply container for storing water to be supplied into an ice making device disposed in at least the body or the door, the water supply container including a main water supply container having a portable mineral water bottle shape and a sub water supply container being replaceable with the main water supply container; a water supply passage fluidly connecting the main water supply container or the sub water supply container to the ice making device; a pump disposed in the water supply passage to pump the water within the water supply container; a container connecting part disposed in the storage space or the door, the container connecting part additionally including a structure for coupling the main water supply container and a structure for coupling the sub water supply container.

In a yet further embodiment, a refrigerator includes: a body including an ice making device; a water supply container storing water to be supplied into at least an ice making device; a water supply passage fluidly connected to the water supply container and the ice making device; a pump disposed in the water supply passage to pump the water within the water supply container; a container connecting part to which an opening of the water supply container is selectively detachably coupled, the container connecting part being disposed in a refrigerating compartment or a refrigerating compartment door defined in the body, wherein the water supply passage includes: a water feeding passage extending from the ice making device to the refrigerating compartment or the refrigerating compartment door; a suction passage extending from the container connecting part toward an inside of the water supply container; and a connecting passage fluidly connecting the water feeding passage to the suction passage.

In a yet further embodiment, a refrigerator includes: a body defining a storage space; a water supply container storing water to be supplied into at least an ice making device, the water supply container being detachable from the refrigerator; a water supply passage fluidly connecting the water supply container to the ice making device; a container connecting part to which an opening of the water supply container is detachably coupled, the container connecting part being disposed in a refrigerating compartment of the body or a refrigerating compartment door, and a pump, at least portion of the pump disposed in the container, the pump being configured to pump the water within the water supply container to the water supply passage.

According to proposed embodiments, a refrigerator is provided in which a water supply container can be disposed in a refrigerating compartment or a refrigerating compartment door to supply water into an ice making device and/or a dispenser without requiring connection to an external water pipe. Thus, an installation place of the refrigerator is not limited, and the refrigerator can be easily installed and installation costs can be reduced.

Also, a container connecting part and a pump can be disposed in a housing to form a modular housing. Thus, since the modular housing is disposed according a model of the refrigerator, a common refrigerating compartment door can be used in order to reduce manufacturing costs.

Also, since a mineral water bottle generally available everywhere may be used as the water supply container, reliable water supply is possible. In addition, various sizes of mineral water bottles can be accommodated by a holder to improve a user's convenience.

Also, the water supply container is selectively attachable to and detachable from the container connecting part to easily install the water supply container such as the mineral water bottle as well as provide a stably fixed structure.

DETAILED DESCRIPTION OF THE INVENTION

Reference will now be made in detail to the embodiments of the present disclosure, examples of which are illustrated in the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

Hereinafter, a side-by-side type refrigerator in which a freezing compartment and a refrigerating compartment are disposed at left and right sides, respectively, will be described as an example. However, the present disclosure is not limited thereto. For example, the present invention is usable with a top mount type refrigerator in which the freezing compartment is disposed over the refrigerating compartment or a bottom freezer type refrigerator in which the freezing compartment is disposed under the refrigerating compartment.

Figure 1:
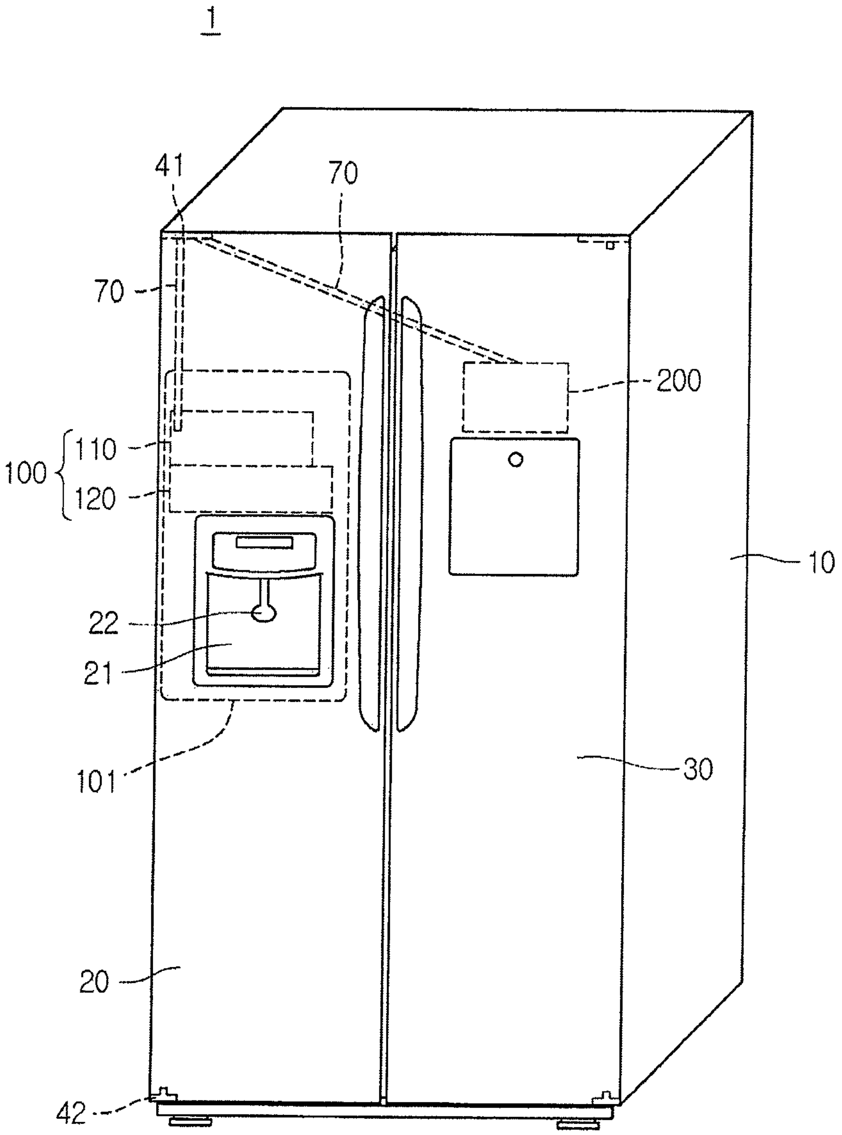
FIG. 1 is a perspective view of a refrigerator including a water supply unit according to a first embodiment.
Figure 2:
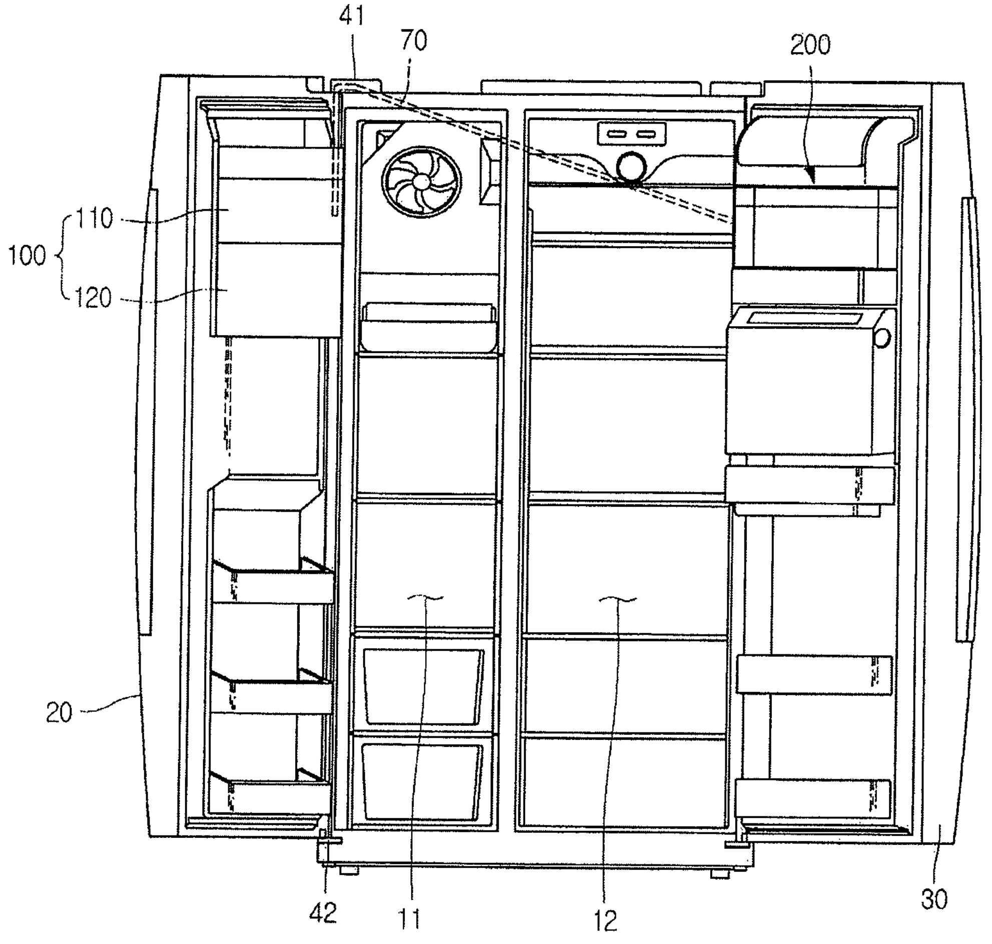
FIG. 2 is a front view illustrating the inside of the refrigerator when a refrigerating compartment door is opened according to the first embodiment.

FIG. 1 is a perspective view of a refrigerator 1 including a water supply unit 200 according to a first embodiment, and FIG. 2 is a front view illustrating the inside of the refrigerator 1 when a refrigerating compartment door 30 is opened.

Referring to FIGS. 1 and 2, a refrigerator 1 includes a body 10 including a cooling compartment. The cooling compartment includes a freezing compartment 11 and a refrigerating compartment 12 each containing cooling air. A freezing compartment door 20 and a refrigerating compartment door 30 are pivotally installed on a front surface of the body 10 to selectively open and close the freezing compartment 11 and the refrigerating compartment 12, respectively. In detail, upper hinge parts 41 and lower hinge parts 42 are coupled to upper and lower portions, respectively, of each of doors 20 and 30. The hinge parts 41 and 42 allow the freezing compartment door 20 and the refrigerating compartment door 30 to be rotated with respect to the body 10.

An ice making device 100 for making ice and storing the ice may be disposed in the freezing compartment 11. The freezing compartment 11 includes a freezing compartment chamber, defined by an inner space of the body 10, and a back surface of the freezing compartment door 20. The freezing compartment door 20 substantially constitutes a portion of the freezing compartment 11. Thus, generally describing the ice making device 100 as being disposed in the freezing compartment 11 should be considered to encompass an arrangement where the ice making device 100 is disposed inside the freezing compartment chamber and an arrangement where the ice making device 100 is instead disposed in or on the freezing compartment door 20.

The ice making device 100 includes an ice maker 110 and an ice bank 120. The ice maker 110 includes an ice tray in which a plurality of cubes for making ice is arranged. An insulation case 101 may be disposed at an outer surface of the ice making device 100 to separate the ice making device 100 from cooling air of the freezing compartment 11. Cooling air supplied from an evaporator (not shown) may be transferred into the ice making device 100 through an additional cooling air passage. Since the cooling air within the freezing compartment 11 is not introduced into the ice making device 100 due to the insulation case 101, food smell within the freezing compartment 11 is prevented from being introduced into the ice making device 100, so that clean smelling hygienic ice can be obtained.

A dispenser 21 is disposed in the freezing compartment door 20. The ice stored in the ice bank 120 is discharged into the dispenser 21 through an ice chute (not shown) for discharging the ice. A manipulation lever 22 is disposed in the dispenser 21 to discharge the ice by a user's manipulation.

A water supply unit 200 may be disposed in the refrigerating compartment 12. The refrigerating compartment 12 includes a refrigerating compartment chamber, defined by an inner space of the body 10, and a back surface of the refrigerating compartment door 30. The refrigerating compartment door 30 substantially constitutes a portion of the refrigerating compartment 12. Thus, generally describing an element as being disposed in the refrigerating compartment 12 should be considered to encompass an arrangement where the element is disposed inside the refrigerating compartment chamber and an arrangement where the element is instead disposed in or on the refrigerating compartment door 30.

The water supply unit 200 is connected to the ice making device 100 through a water feeding passage 70. A pump (that will be described later) for pumping water stored in the water supply unit 200 into the water feeding passage 70 may be provided. The pump may be one of the components constituting the water supply unit 200.

The water supply unit 200 may be disposed in the refrigerating compartment door 30 so that sufficient food storage space remains in the refrigerating compartment 12. A capacity of water stored in a water tank (that will be described later) is determined according to a size of the water supply unit 200. That is, if the size of the water supply unit 200 increases, an acceptable size of the water tank increases to increase the capacity of the stored water.

The water feeding passage 70 may be disposed around the refrigerating compartment 12. This is done because the water within the water feeding passage 70 may be frozen if the water feeding passage 70 is disposed via the freezing compartment 11. Thus, the water feeding passage 70 is disposed around the refrigerating compartment 12 to prevent the water within the water feeding passage 70 from being frozen. If an insulation member for preventing heat from being transmitted to an outer circumference surface of the water feeding passage 70 is provided, the water feeding passage 70 may be disposed via the freezing compartment 11.

Also, the water feeding passage 70 may be disposed via an outside of the body 10. Since the water feeding passage 70 is disposed via the outside of the body 10, the water feeding passage 70 may be easily replaced from the outside when the inside of the water feeding passage 70 is polluted by the water, so that the user can enjoy hygienic ice.

If the water feeding passage 70 is disposed outside of the body 10, the water feeding passage 70 may be connected to the ice maker 110 via the upper hinge part 41. A hole through which the water feeding passage 70 passes may be defined in the upper hinge part 41. In this case, since the upper hinge part 41 is a rotational center of the freezing compartment door 20, the water feeding passage 70 does not have an effect on rotation of the freezing compartment door 20.

The water feeding passage 70 may be buried in the freezing compartment door 20, so that the water feeding passage 70 is not exposed to the outside and the cooling air of the freezing compartment 11. Also, the water feeding passage 70 connected to the pump (that will be described later) may be disposed via back and top surfaces of the body 10. Thus, a length of the water feeding passage 70 may be reduced. In this case, the water feeding passage 70 may be disposed such that the user does not see the water feeding passage 70. A recess in which the water feeding passage 70 is seated may be disposed in the back and top surfaces of the body 10. The recess may be formed by a press working when an outward appearance of the body 10 is manufactured.

A cover covering a bent portion of the water feeding passage 70 may be coupled to a portion through which the water feeding passage 70 passes through the back surface of the body 10. The portion through which the water feeding passage 70 passes may be sealed by a sealing member such that the cooling air within the refrigerator 1 does not leak out.

A coupling (not shown) may be coupled to a portion at which the water feeding passage 70 is exposed to the outside of the refrigerator and a portion at which the water feeding passage 70 is buried in the body 10 or in the freezing compartment door 20 and refrigerating compartment door 30. The portion at which the water feeding passage 70 is exposed to the outside and the portion at which the water feeding passage 70 is buried are easily coupled by the coupling. In this case, the portion at which the water feeding passage 70 is exposed to the outside may be easily replaced and repaired.

Figure 3:
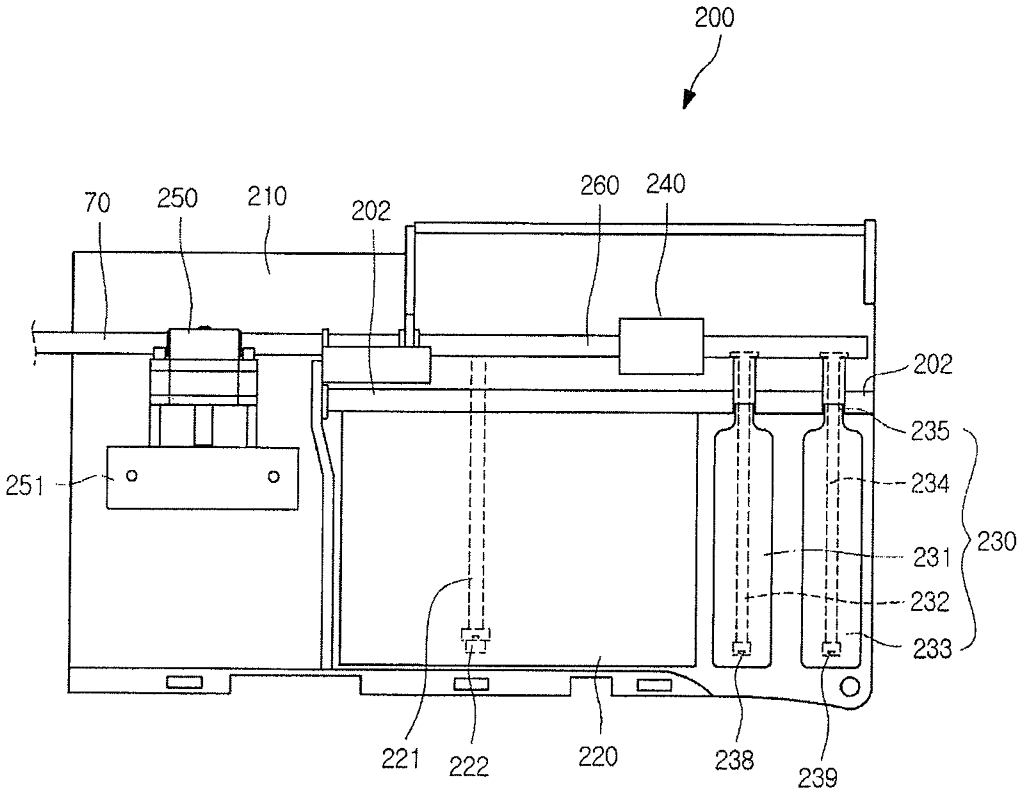
FIG. 3 is a view of the water supply unit according to the first embodiment.

FIG. 3 is a front view of the water supply unit according to the first embodiment. Referring to FIG. 3, the water supply unit 200 includes first, second, and third water supply containers 220, 231, and 233, a container connecting part 202, a pump 250, a connecting passage 260, and a housing 210. The pump 250 includes an impeller driven by an electric motor. The first, second and third water supply containers 220, 231, and 233 store water to be supplied into the ice making device 100. The container connecting part 202 connects the water supply containers 220, 231, and 233 to the water supply unit 200. The pump 250 pumps the water stored in the water supply containers 220, 231, and 233 into the ice making device 100. The connecting passage 260 supplies the water pumped from the water supply containers 220, 231, and 233 into the ice making device 100. The housing 210 defines an external appearance of the water supply unit 200 and allows the water supply containers 220, 231, and 233 and the pump 250 to be coupled to the refrigerating compartment door 30. The container connecting part 202 may be a portion the housing 210.

In detail, the water supply unit 200 may have approximately a rectangular parallelepiped shape. The water supply unit 200 may be long in a horizontal direction and relatively short in width in front and rear directions such that the water supply unit 200 is closely coupled to the refrigerating compartment door 30.

The first water supply container 220 serves as a main water supply container of the water supply unit 200 and may be detachably coupled to the housing 210. The user can separate the first water supply container 220 from the housing 210 in order to store the water in the first water supply container 220 or wash the inside of the first water supply container 220. A detachable cover tank (not shown) for containing the water may be disposed on a top surface of the first water supply container 220.

A first suction passage 221 is fluidly connected to the connecting passage 260 to supply the water within the first water supply container 220 into the connecting passage 260. The first suction passage 221 may extend from an end portion of the connecting passage 260 to the inside of the first water supply container 220 to pass through the container connecting part 202.

A first filter 222 may be disposed inside the first water supply container 220 to filter the water before the water is supplied into the ice making device 100. The first filter 222 is disposed at an end portion of the first suction passage 221. When the pump 250 operates in a state where the first water supply container 220 is installed, the water is introduced into the connecting passage 260 through the first filter 222 and the first suction passage 221. The water introduced into the connecting passage 260 is supplied into the ice making device 100 through the water feeding passage 70.

The second water supply container 231 and the third water supply container 233 are detachably disposed on the housing 210 adjacent to the first water supply container 220. The second water supply container 231 and the third water supply container 233 may be threadably engaged with the container connecting part 202. A screw thread formed on an outer circumference of an opening of a portable plastic water container that is generally available everywhere is screw-coupled to the container connecting part 202.

Although two water supply containers 231 and 233 are coupled as illustrated in FIG. 3, the present disclosure is not limited thereto. For example, one water supply container or three or more water supply containers may be provided according to a required supply amount of the water.

The housing 210 may have at least one opened surface such that the first, second, and third water supply containers 220, 231, and 233 are easily separated from the housing 210.

A second suction passage 232 and a third suction passage 234 extend in an inward direction of the second water supply container 231 and the third water supply container 233, respectively. The second suction passage 232 and the third suction passage 234 guide the water within the second water supply container 231 and the third water supply container 233 to the connecting passage 260, respectively, and are fluidly connected to the connecting passage 260. A second filter 238 and a third filter 239 are disposed at a lower end of the second suction passage 232 and the third suction passage 234 to purify the water within the second water supply container 231 and the third water supply container 233, respectively. As described above, since the second water supply container 231 and the third water supply container 233 are provided, a total capacity of the water supply containers 220, 231, and 233 increases to enhance a user's convenience.

A water collecting part 240 collecting the water pumped from the second and third water supply containers 231 and 233 is disposed at an upper side of the second water supply container 231 and the third water supply container 233. The water collected in the water collecting part 240 is supplied into the ice making device 100 through the pump 250.

The container connecting part 202 is horizontally disposed such that the water supply containers 220, 231, and 233 are disposed at a lower side thereof. Mounting holes 235 through which the second water supply container 231 and the third water supply container 233 detachably pass, respectively, are defined in the container connecting part 202. That is, the mounting holes 235 are holes that are defined in the container connecting part 202. Each of the mounting holes 235 has a predetermined thickness such that the second water supply container 231 and the third water supply container 233 are coupled to the mounting holes 235, respectively. That is to say, a screw thread may be formed on an inner circumference of each of the mounting holes 235, and thus is coupled to a screw thread formed on each of outer circumferences of the openings of the second and third water supply containers 231 and 233.

The structure in which the second and third water supply containers 231 and 233, the second and third suction passages 232 and 234, and the container connecting part 202 are included, and the second and third water supply containers 231 and 233 are detachably disposed in the housing 210 may be collectively referred to as a detachable water supply part 230.

The pump 250 for pumping the water from the water supply containers 220, 231, and 233 is disposed in a side of the first water supply container 220. A performance of the pump 250 may be determined in consideration of the heights of the water supply containers 220, 231, and 233. A mounting part 251 allowing the pump 250 to be mounted on the housing 210 may be disposed in a side of the pump 250.

The pump 250 is connected to the connecting passage 260 that provides a passage to supply the water from the water supply containers 220, 231, and 233 to the ice making device 100. The connecting passage 260 may be disposed in an upper side of the water supply containers 220, 231, and 233.

When the water supply containers 220, 231, and 233 are installed, the water supply containers 220, 231, and 233 are fluidly connected to the connecting passage 260. That is, the suction passages 221, 232, and 234 are connected to the connecting passage 260, and the water purified by passing through the filters 222, 238, and 239 disposed at the end portions of the suction passages 221, 232, and 234 pass through the suction passages 221, 232, and 234, the connecting passage 260, and the water feeding passage 70 in that order, and then is supplied into the ice making device 100.

Figure 4:
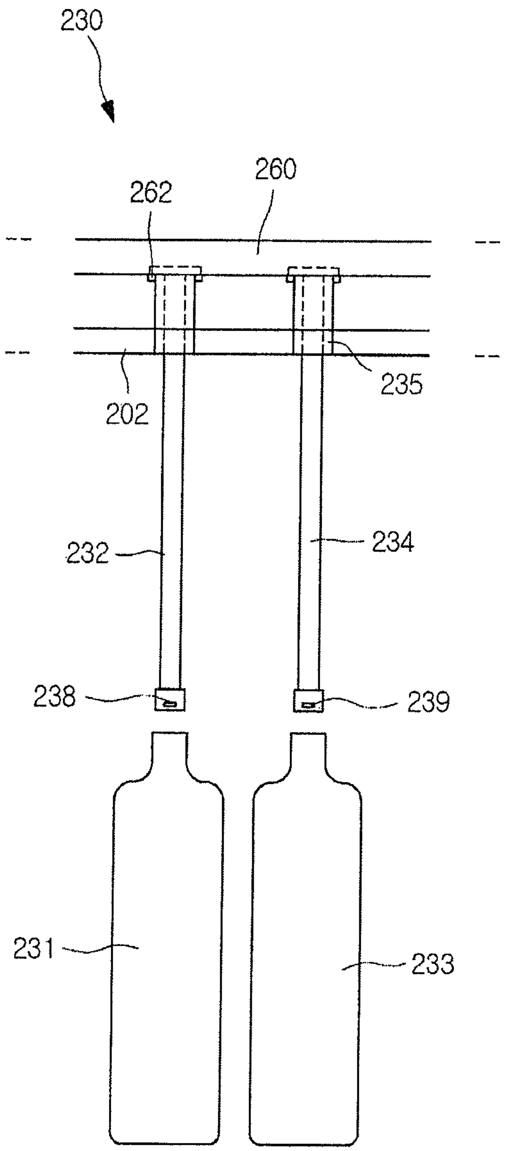
FIG. 4 is an exploded view of a detachable water supply part according to the first embodiment.
Figure 5:
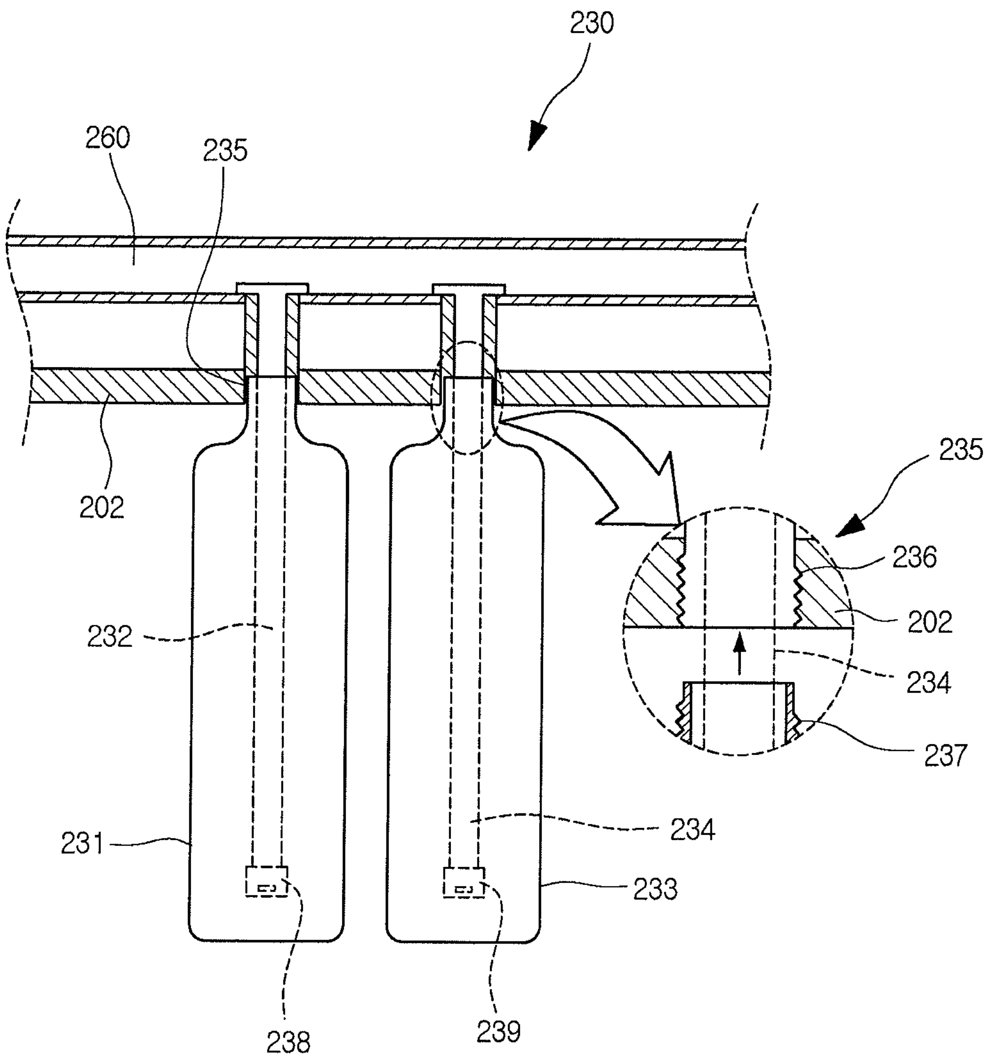
FIG. 5 is a cross-sectional view of the detachable water supply part when a water tank is coupled according to the first embodiment.

FIG. 4 is an exploded view of a detachable water supply part 230 according to the first embodiment, and FIG. 5 is a cross-sectional view of the detachable water supply part 230 when water containers 231, 233 are coupled thereto.

Referring to FIGS. 4 and 5, a detachable water supply part 230 according to this embodiment includes the second and third water supply containers 231 and 233 for storing the water, the second and third suction passages 232 and 234 connected to the connecting passage 260, the second and third filters 238 and 239 disposed at the end portions of the second and third suction passages 232 and 234 to purify the water, and the container connecting part 202 depressed inwardly and coupled to the second and third water supply containers 231 and 233.

In detail, the second and third water supply containers 231 and 233 may be coupled to the mounting holes 235 from a downward direction toward an upward direction of the second and third filters 238 and 239. A portable storage container may be used as the second and third water supply containers 231 and 233. For example, a widely used polyethylene telephthalate (PET) bottle may be used. A second screw thread 237 to be coupled to each mounting hole 235 is formed on each outer circumferential surface of the openings of the second and third water supply containers 231 and 233.

The mounting hole 235 is disposed in the container connecting part 202 such that the second and third water supply containers 231 and 233 may be coupled thereto. That is, the mounting hole 235 vertically passes through the container connecting part 202. A first screw thread 236 corresponding to the second screw thread 237 is formed on the mounting hole 235.

Thus, the second and third water supply containers 231 and 233 may be screw-coupled to the mounting hole 235. Since the second and third water supply containers 231 and 233 are screw-coupled, the second and third water supply containers 231 and 233 are completely coupled, and thus, water can be prevented from leaking to the outside.

Also, the second and third suction passages 232 and 234 may pass through the mounting holes 235. The end portions of the second and third suction passages 232 and 234 are coupled in communication with an inner space of the connecting passage 260. A sealing member may be disposed on an outer surface of the connecting passage 260, that is, positions at which the second and third suction passages 232 and 234 are coupled to the connecting passage 260. Due to the sealing member, water is prevented from leaking from coupling portions of the second and third suction passages 232 and 234 and the connecting passage 260. The second and third suction passages 232 and 234 extend downwardly to pass through the mounting hole 235.

The second and third filters 238 and 239 are disposed at the other sides of the second and third suction passages 232 and 234, respectively, to purify the water stored in the second and third water supply containers 231 and 233 while the water is pumped by the pump 250.

A process in which the water is supplied into the ice making device 100 by the water supply unit 200 according to this embodiment will be simply described. The first water supply container 220 is installed in the water supply unit 200. Considering an amount of ice to be made, the second water supply container 231 and the third water supply container 233 may be additionally installed. Of course, further water supply containers may be additionally installed.

The second water supply container 231 and the third water supply container 233 are disposed from a downward direction toward an upward direction of the second suction passage 232 and the third suction passage 234. The openings of the water supply containers 231 and 233 are inserted into the mounting holes 235, respectively. In detail, in a state where the openings of the water supply containers 231 and 233 are inserted into the mounting holes 235, the water supply containers 231 and 233 are spun. As a result, the openings of the water supply containers 231 and 233 are screw-coupled to the mounting holes 235, respectively.

When the pump 250 operates, the water stored in the water supply containers 220, 231, and 233 rises from the water supply containers 220, 231, and 233 due to a suction force. At this time, the water passes through the filters 222, 238, and 239 and is introduced into the suction passages 221, 232, and 234 to move the water into the connecting passage 260. The water may be supplied into the ice making device 100 through the pump 250 and the water feeding passage 70 in series.

In a situation where the suction force of the pump 250 is applied to the water supply containers 220, 231, and 233, the water may be supplied first into the first water supply container 220 most adjacent to the pump 250 due to the pumping of the pump 250.

The first water supply container 220 may have a shape of an exclusive water supply container provided in refrigerator products. That is to say, the first water supply container 220 may be an exclusive water supply container having a shape and size corresponding to those of the water supply unit 200 disposed inside the refrigerator 1 or in the back surface of the refrigerating compartment door 30. The first water supply container 220 may be defined as a main water supply container, and the second and third water supply containers 231 and 233 may be defined as sub water supply containers, or vice versa. That is to say, the first water supply container 220 may be defined as a sub water supply container, and the second and third water supply containers 231 and 233 may be defined as main water supply containers. Also, a mineral water bottle having the same shape as the second and third water supply containers 231 and 233 may be provided instead of the first water supply container 220 that is the main water supply container for the refrigerator 1.

Figure 6:
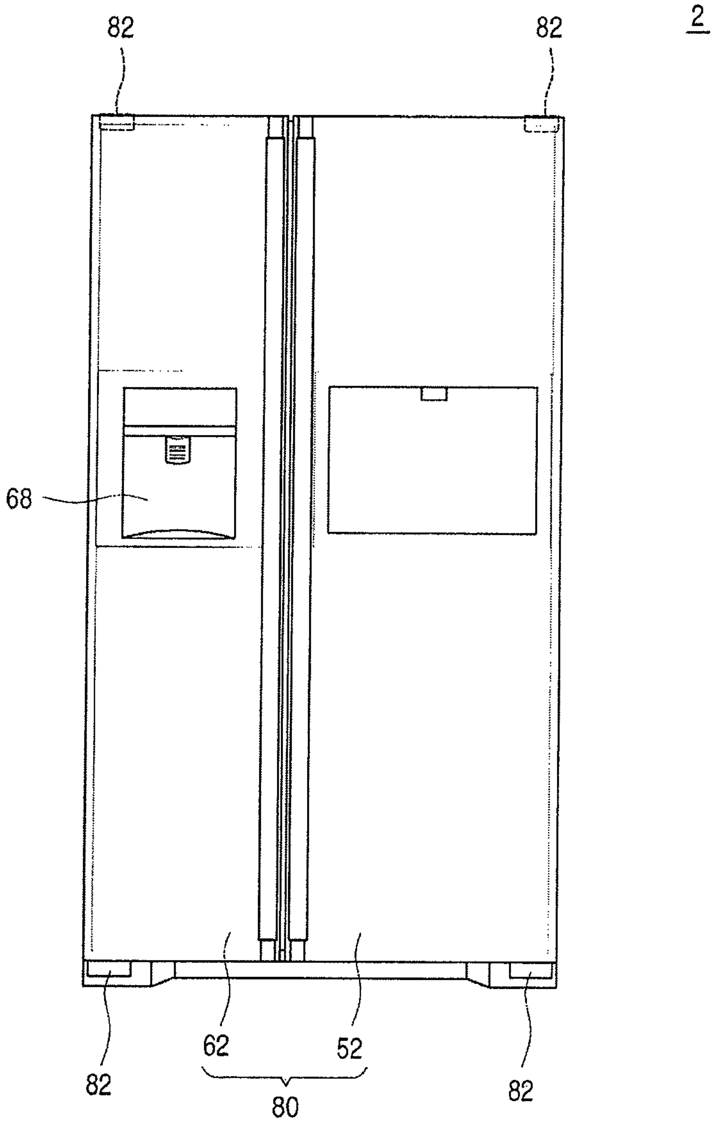
FIG. 6 is a front view of a refrigerator according to a second embodiment.
Figure 7:
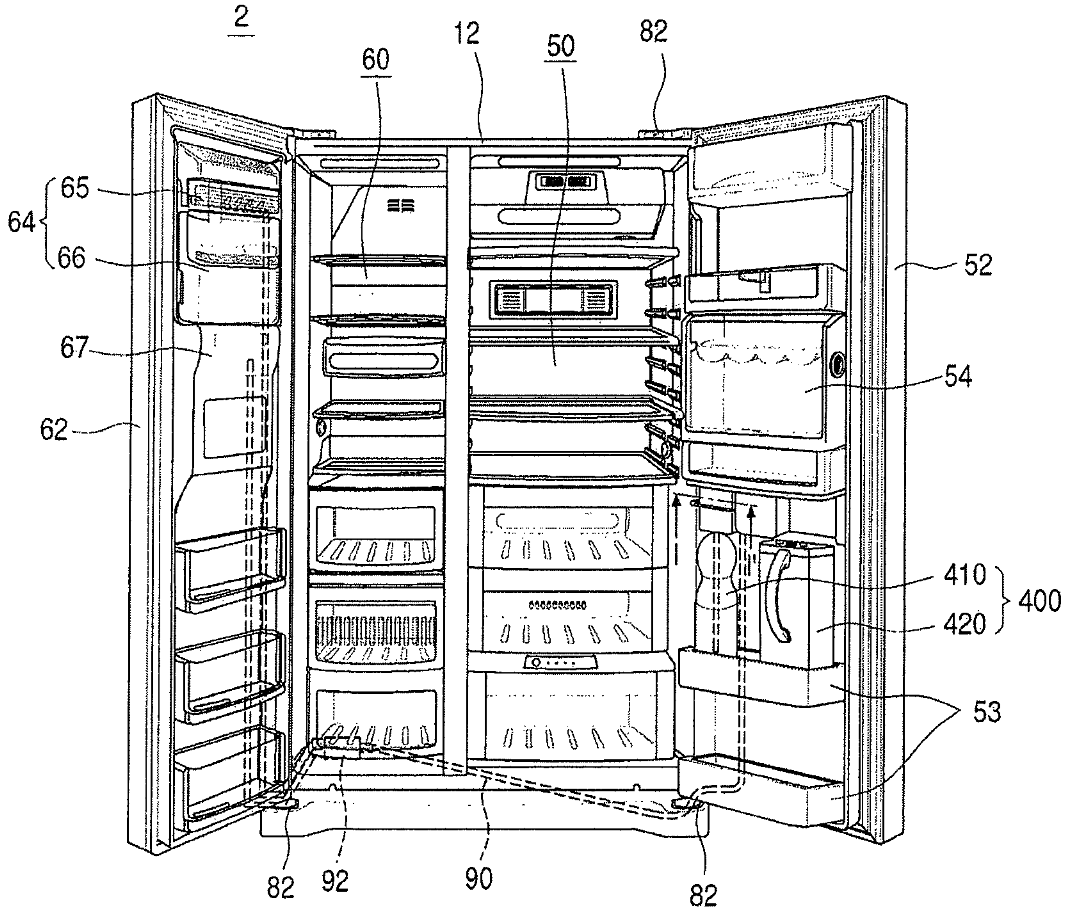
FIG. 7 is a front view illustrating the inside of the refrigerator when a refrigerating compartment door is opened according to the second embodiment.

Hereinafter, a water supply unit according to a second embodiment will be described with reference to accompanying drawings. FIG. 6 is a front view of a refrigerator 2 according to a second embodiment, and FIG. 7 is a front view illustrating the inside of the refrigerator 2 when a refrigerating compartment door 52 is opened.

A refrigerator 2 according to the second embodiment includes a body 12 forming a storage space divided into a refrigerating compartment 50 and a freezing compartment 60, and doors 80 selectively shielding the refrigerating compartment 50 and the freezing compartment 60. A configuration of the refrigerator 2 is defined by the body 12 and the doors 80.

The doors 80 include a refrigerating compartment door 52 and a freezing compartment door 62. The doors 80 are pivotally coupled to the body 12 by hinges 82 connecting the body 12 to the doors 80. The hinges become a rotation axis, and at the same time, may have a hollow therein such that a water supply passage 90 that will be described later in detail and/or an electric wire may pass through the hinges 82.

A storage space within the body 12 is partitioned by a shelf, a drawer, and a basket, and a plurality of components for receipt of food items is disposed in a back surface of the doors 80.

A water supply container 400 is provided in the refrigerating compartment door 52. The water supply container 400 is detachably coupled to a container connecting part 600 that will be described later in detail. A main water supply container 410 that is a mineral water bottle generally available everywhere or a sub water supply container 420 that is an exclusive container detachably coupled to the container connecting part 600 may be used as the water supply container 400.

Also, the main water supply container 410 and the sub water supply container 420 may be received in a basket 53 supporting the water supply container 400 at a lower portion of the container connecting part 600. A capacity of the sub water supply container 420 may be greater than that of the main water supply container 410. Thus, the main water supply container 410 may be replaced with the sub water supply container 420 as necessary, and vice versa.

An ice making device 64 and a dispenser 68 are provided in the freezing compartment door 62. The ice making device 64 and the dispenser 68 may both be provided, or only the ice making device 64 may be provided as necessary. The ice making device 64 includes an ice maker 65 for making ice and an ice bank 66 for storing the ice. The ice making device 64 may be disposed within an insulation space additionally provided inside the freezing compartment 60 or in the refrigerating compartment door 52 according to a shape of the refrigerator 2.

Drinking water may be dispensed through the dispenser 68 from the outside. The dispenser 68 is disposed in an outer surface of the freezing compartment door 62. The dispenser 68 communicates with the ice bank 66 through an ice chute 67 to dispense the ice.

The ice making device 64 and the dispenser 68 receive the water from the water supply container 400. For this, the ice making device 64 and the dispenser 68 are fluidly connected by the water supply container 400 and the water supply passage 90. A switching valve 92 is provided in the water supply passage 90 to selectively supply the water supplied from the water supply container 400 into the ice making device 64 and/or the dispenser 68.

The water supply passage 90 is disposed via the refrigerating compartment door 52, the freezing compartment door 62, and the body 12. In an arrangement where the water supply passage 90 is disposed via the doors 80 and the body 12, the water supply passage 90 passes through the hinge 82. In an arrangement where the water supply passage 90 is disposed via the freezing compartment 60, the water supply passage 90 may be buried in an insulation member within the doors 80 and the body 12 to prevent the water within the water supply passage 90 from being frozen.

Also, the water supply passage 90 may be disposed via the outside of the body 12, and at least a portion passing via the freezing compartment 60 at which freezing may occur may be disposed along an outer surface of the body 12.

Figure 8:
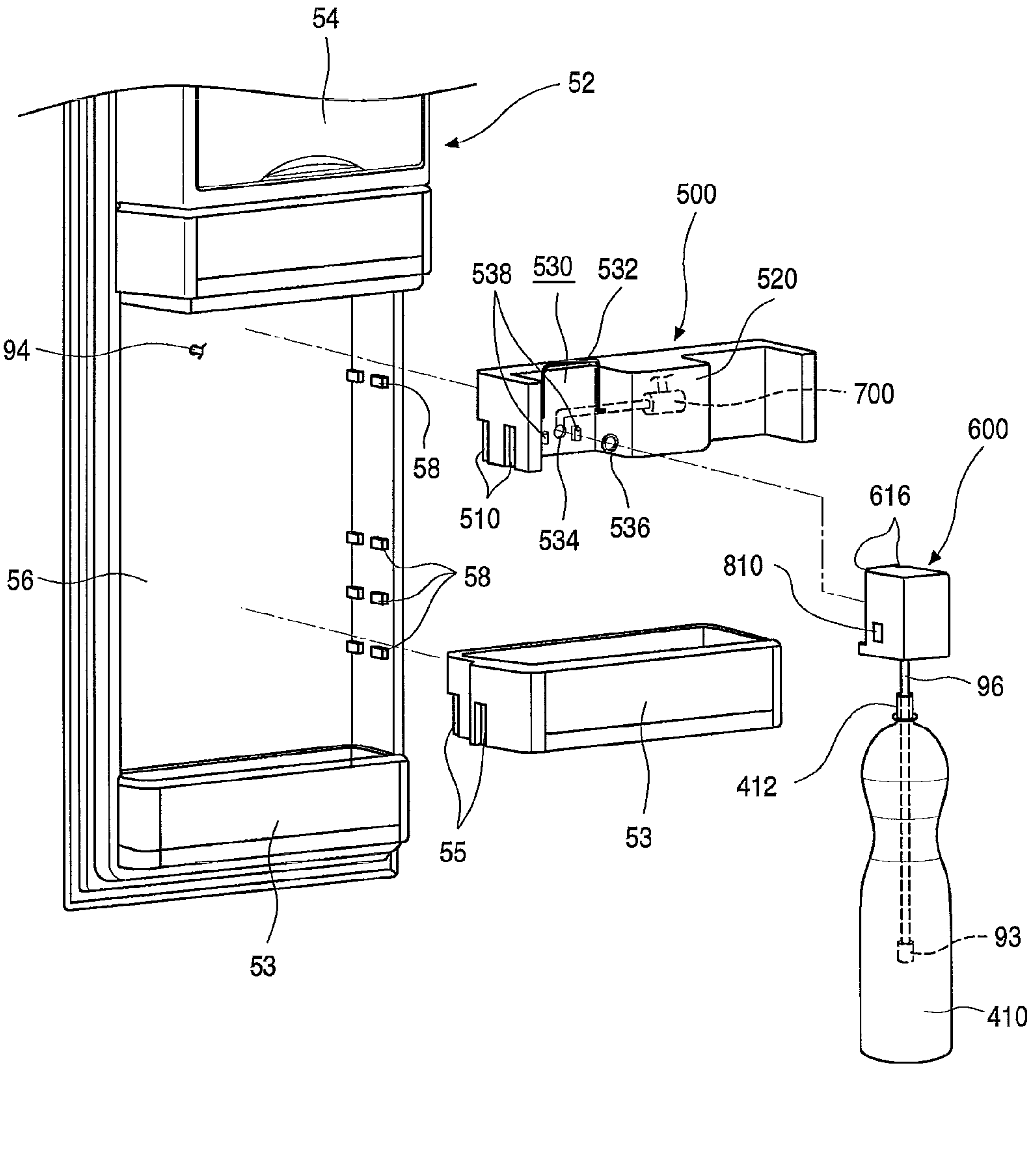
FIGS. 8 and 9 are exploded perspective views of the refrigerating compartment door according to the second embodiment.
Figure 9:
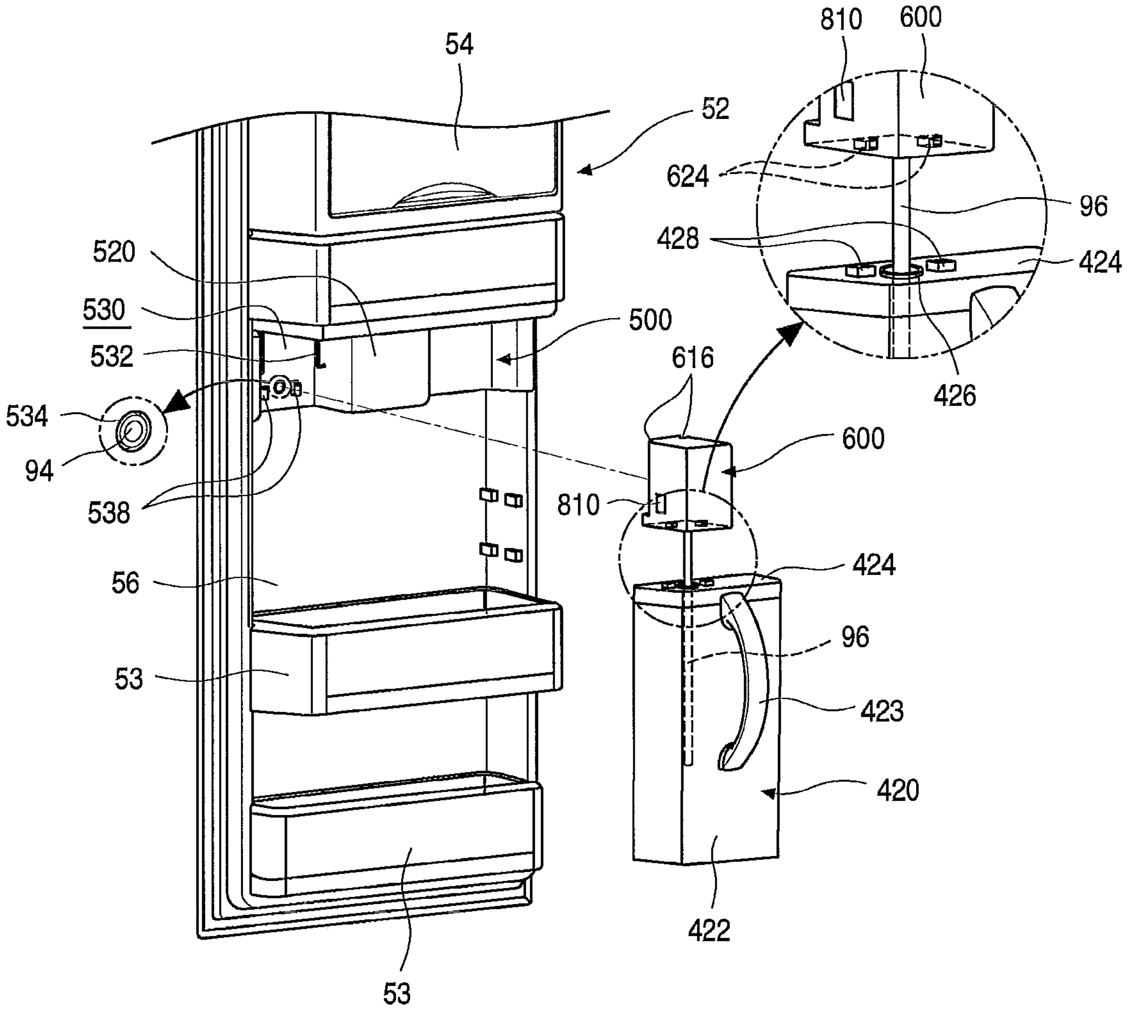

FIGS. 8 and 9 are exploded perspective views of the refrigerating compartment door 52 according to the second embodiment. Referring to FIGS. 8 and 9, a housing 500 is disposed in a back surface of the refrigerating compartment door 52. The housing 500 includes the container connecting part 600 detachably coupled to the water supply container 400, and a pump 700 to form one module. According to a configuration of the refrigerator 2, the housing 500 and a refrigerator 2 in which the water supply container 400 is not used may have the refrigerating compartment door 52 in common.

The housing 500 may be disposed under a home bar 54 provided in the refrigerating compartment door 52. The housing 500 has a horizontal length corresponding to a left/right width of a door liner 56 defining the back surface of the refrigerating compartment door 52.

A plurality of seating grooves 510 are disposed in left and right sides of the housing 500. A plurality of seating protrusions 58 having a shape corresponding to that of each of the seating grooves is disposed on the door liner 56. Thus, the housing 500 may be installed on an inner surface of the refrigerating compartment door 52 by coupling the seating grooves 510 to the seating protrusions 58. With this arrangement, the housing 500 may be easily separated from the inner surface of the refrigerating compartment door 52 as necessary.

Also, the seating protrusions 58 may be coupled to a plurality of seating grooves 55 disposed on the basket 53 installed on the back surface of the refrigerating compartment door 52. Thus, the housing 500 may be installed instead of the basket 53 as necessary, and vise versa.

A pump receiving part 520 forming a space capable of receiving the pump 700 is disposed inside the housing 500. The pump receiving part 520 protrudes from an appropriately central portion of the housing 500. The pump 700 pumps water from the water supply container 400 to supply the pumped water into the ice making device 64 and/or the dispenser 68, and is connected to the water supply passage 90.

The pump receiving part 520 has an opened back surface, and the pump 700 may be installed through the opened back surface. The pump receiving part 520 protrudes in a front direction up to the same height as those of the container connecting part 600 in which the water supply container 400 is selectively detached and left and right side ends of the housing 500.

A seating part 530 relatively depressed toward a rear direction is disposed at one side of the pump receiving part 520. The seating part 530 provides a space in which the container connecting part 600 is seated. A width of the seating part 530 is greater than that of a horizontal width of the container connecting part 600. Thus, a finger of a user may be inserted into left and right spaces between the seating part 530 and the container connecting part 600 in a state where the container connecting part 600 is installed in the seating part 530. Therefore, the container connecting part 600 and the water supply container 400 can be easily detached.

A restriction member 532 is disposed in the seating part 530. The restriction member 532 prevents the container connecting part 600 from being accidentally separated from the seating part 530 when the container connecting part 600 is installed in the seating part 530. The restriction member 532 may be formed of a wire material. Both ends of the restriction member 532 are pivotally fixed to both left and right sidewalls of the seating part 530. The restriction member 532 is bent to surround the container connecting part 600 when the restriction member 532 is pivoted.

A passage inserting hole 534 is formed in a central portion of a back surface of the seating part 530. A container-side passage 96 inside the container connecting part 600 is inserted into the passage inserting hole 534. An end portion of a water feeding passage 94 extending from the ice making device 64 and/or the dispenser 68 is exposed through the passage inserting hole 534 for connection with the pump 700.

Thus, the container-side passage 96 protruding in an outward direction of the container connecting part 600 may be connected to the water supply passage 90 through the passage inserting hole 534 when the container connecting part 600 is installed. A tube or a sealing member 536 may be provided on the passage inserting hole 534 to sealingly connect the water feeding passage 94 to the container-side passage 96.

First coupling parts 538 for coupling of the container connecting part 600 are disposed on both left and right sides of the passage inserting hole 534. Each of the first coupling parts 538 has a shape corresponding to that of each of second coupling parts 616 disposed on the container connecting part 600 such that the first coupling parts 538 are coupled and separated to/from the second coupling parts 616.

The container connecting part 600 is selectively detached from the housing 500. The water supply container 400 storing the water to be supplied into the ice making device 64 and/or the dispenser 68 is selectively detached from the container connecting part 600.

As shown in FIG. 7, the main water supply container 410 and the sub water supply container 420 may be selectively used as the water supply container 400 coupled to the container connecting part 600. A structure in which the main water supply container 410 is installed is illustrated in FIG. 8. For this, a holder 800 (see FIG. 11) for selectively holding the main water supply container 410 is further disposed on the container connecting part 600.

A mineral water bottle may be used as the main water supply container 410. Such a mineral water bottle is generally available everywhere, and has a plastic or glass bottle shape in which an opening 412 at the upper end through which water goes in and out. A mineral water bottle having various sizes capable of being coupled to the container connecting part 600 may be used. A cap of the available mineral water bottle is removed, and then, the bottle may be directly used.

A structure in which the sub water supply container 420 is installed is illustrated in FIG. 9. For this, one or more container coupling holes 624 and one or more container coupling protrusions 428 having shapes corresponding to each other are further disposed on/in the container connecting part 600 and the sub water supply container 420, respectively.

A capacity of the sub water supply container 420 may be greater than that of the main water supply container 410. The sub water supply container 420 has an appropriate size according to a size of the basket 53 receiving the water supply container 400 and a height of the container connecting part 600.

A configuration of the sub water supply container 420 is defined by a container body 422 storing the water and a cover 424 shielding at least portion of an opened top surface of the container body 422. A handle 423 protruding in a side direction and grasped by the user when the container body 422 is carried by the user is disposed on the container body 422. An opening 426 is provided in the cover 424 through which the water may enter and leave the container body 422. The container coupling protrusions 428 are further disposed on the cover 424.

The container coupling protrusions 428 have a shape corresponding to the container coupling holes 624 that will be described later such that the sub water supply container 420 is fixed to a bottom surface of the container connecting part 600.

Figure 10:
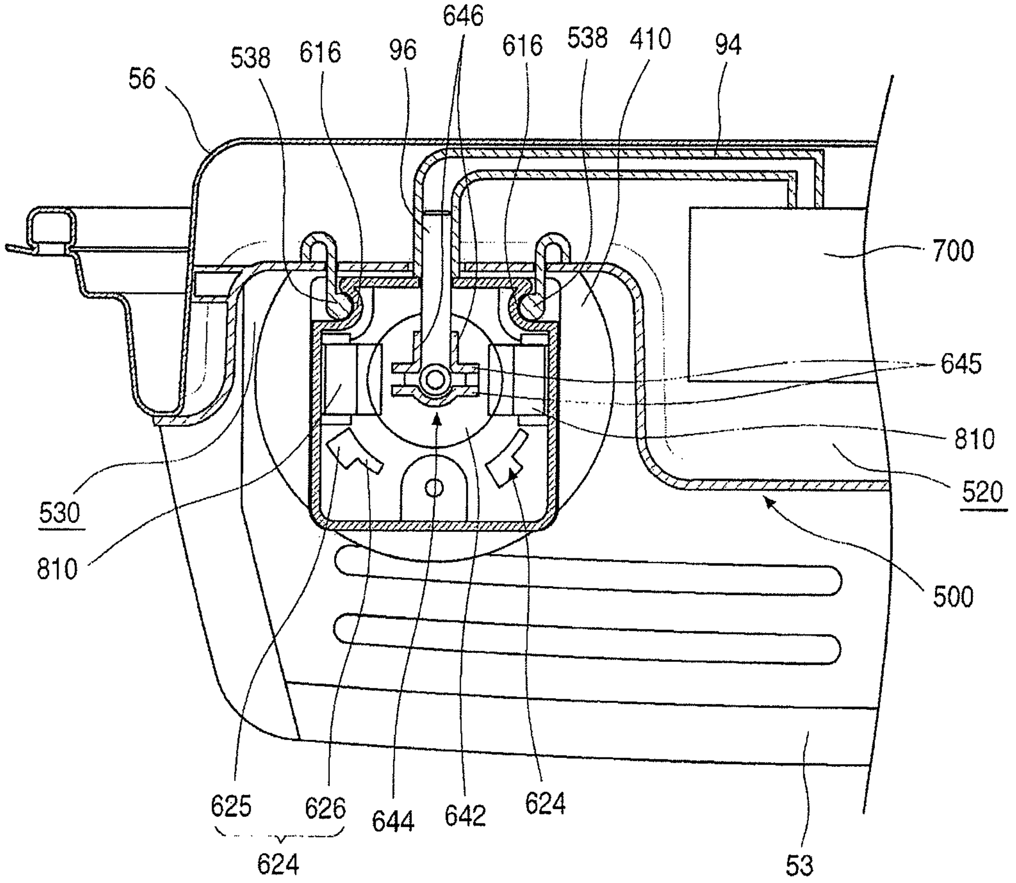
FIG. 10 is a cross-sectional top view of the refrigerating compartment door according to the second embodiment.
Figure 11:
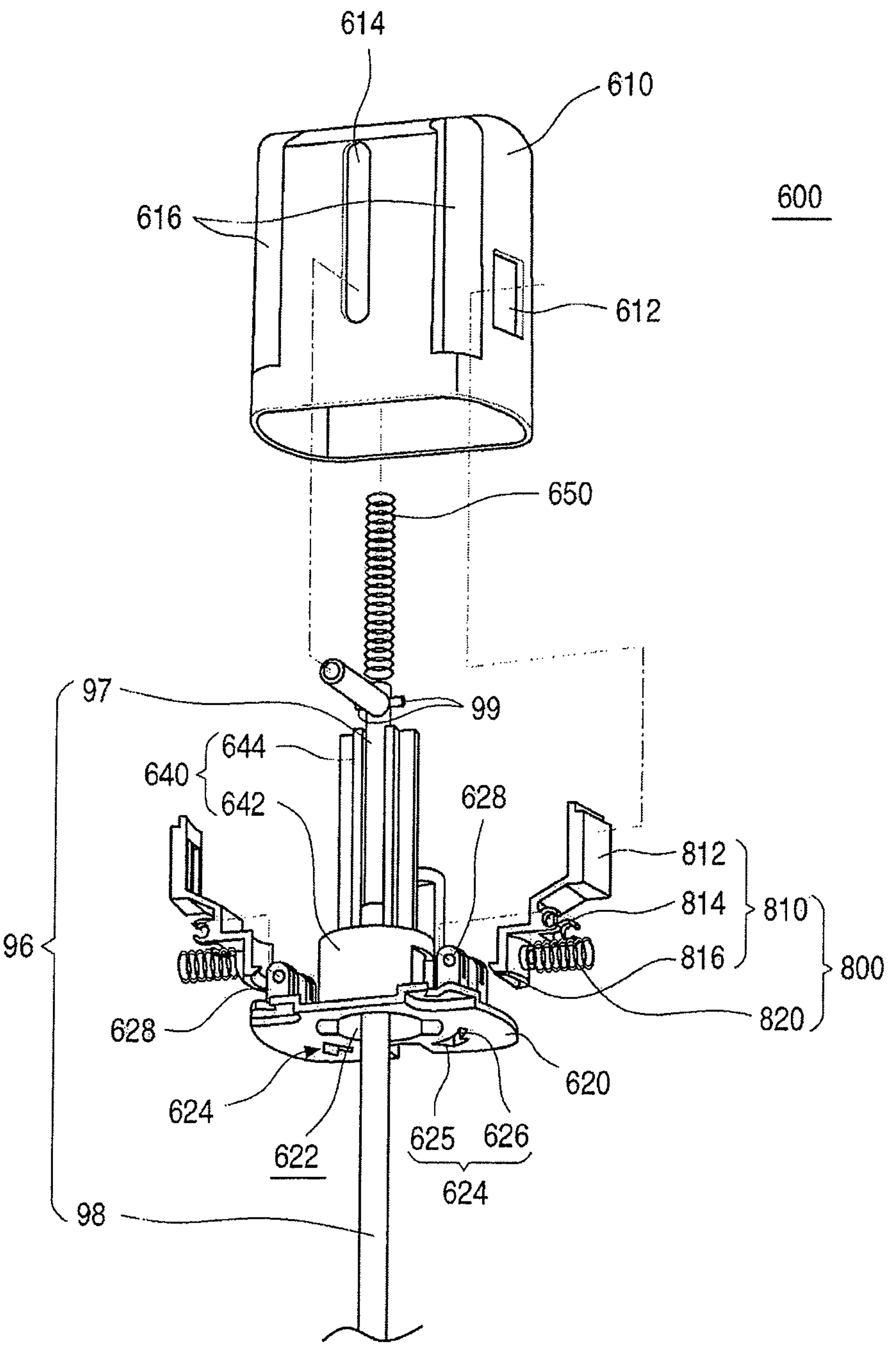
FIG. 11 is a perspective view illustrating a container connecting part according to the second embodiment.
Figure 12:
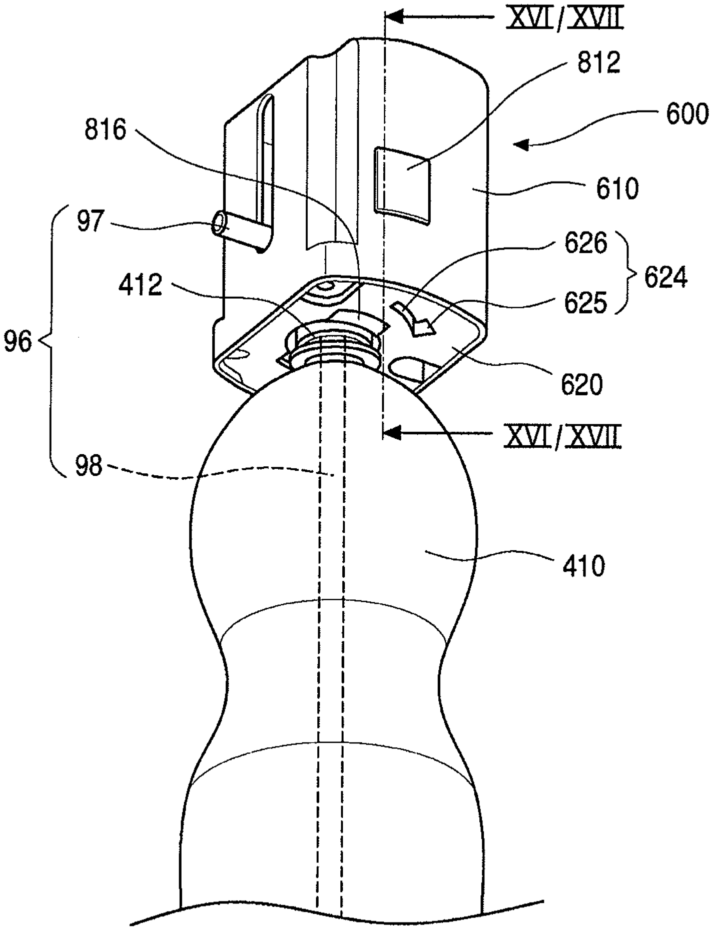
FIG. 12 is a perspective view of a coupling of the container connecting part and a water supply container according to the second embodiment.

FIG. 10 is a top cross-sectional view of the refrigerating compartment door 52 according to the second embodiment, FIG. 11 is a perspective view illustrating a container connecting part 600 according to the second embodiment, and FIG. 12 is a perspective view of a coupling of the container connecting part 600 and a water supply container 410 according to the second embodiment.

Referring to FIGS. 10 to 12, the housing 500 is disposed on the door liner 56 defining the back surface of the refrigerating compartment door 52. The first coupling parts 538 in which the container connecting part 600 is selectively installed are disposed on the seating part of the housing 500. Referring to FIG. 10, the first coupling parts 538 protrude in a direction in which the container connecting part 600 is disposed, and the protruded end portions are rounded inwardly. The first coupling parts 538 may be elastically deformed in an outward direction. Thus, the first coupling parts 538 may be deformed while the container connecting part 600 is detached and may maintain in a fixed state after the container connecting part 600 is installed. The first coupling parts 538 are vertically disposed to prevent the container connecting part 600 from interfering when the container connecting part 600 is moved upwardly and downwardly in a state where the container connecting part 600 is installed.

The passage inserting hole 534 is opened at a central portion between the first coupling parts 538 disposed in left and right sides of the passage inserting hole 534 to expose the end portion of the water feeding passage 94. Thus, the water feeding passage 94 is connected to the pump 700 disposed in the pump receiving part 520. Another portion of the water feeding passage 94 is connected to the other side of the pump 700 and extends toward the ice making device 64 and the dispenser 68.

The container connecting part 600 is installed on the seating part 530. Since the container connecting part 600 is installed, the container-side passage 96 protruding from the inside of the container connecting part 600 to the outside is connected to the water feeding passage 94 through the passage inserting hole 534.

The container connecting part 600 has a shape capable of being received in the seating part 530. A configuration of the container connecting part 600 is defined by the downwardly opened case 610 and a bottom plate 620 inserted into the case 610 and shielding the opened bottom surface of the case 610.

A manipulation part exposing hole 612 opened to expose a manipulation part 812 of a detaching lever 810 that will be described later to the outside is formed in each of both left and right sides of the case 610. A through hole 614 through which the container-side passage 96 passes is formed in a back surface of the case 610. The through hole 614 is vertically slotted, and the case 610 is vertically movable because of the through hole 614 in a state where a height of the container-side passage 96 is fixed.

A depressed second coupling part 616 is disposed in each of both left and right side ends of the back surface of the case 610. An inner circumference surface of the second coupling part 616 is depressed such that the inner circumference surface of the second coupling part 616 corresponds to the shape of the first coupling part 538. Also, the second coupling part 616 is vertically disposed to easily move the case in upward and downward directions in a state where the container connecting part 600 is detached as well as installed.

The second coupling part 616 is opened upwardly and may be coupled to the first coupling part 538 in a tight-fitting manner of front and rear directions as well as in a vertical sliding manner in upward and downward directions.

A container inserting hole 622 is formed in an approximately central portion of the bottom plate 620. The opening 412 of the water supply container 400 is inserted into the container inserting hole 622. The container inserting hole 622 has a relatively large diameter such that water supply containers 400 having various sized openings 412 are insertable into the container inserting hole 622. An opening percentage of the container inserting hole 622 may be adjusted by a holder 800 that will be described later.

The container coupling holes 624 are formed in each of both left and right sides of the container inserting hole 622. The container coupling holes 624 are disposed at a position corresponding to that of the container coupling protrusions 428 disposed on the sub water supply container 420, and are coupled to the container coupling protrusions 428. The container coupling holes 624 include an insertion hole 625 and a pivot hole 626.

The insertion hole 625 is punched with a shape corresponding to a sectional shape of the container coupling protrusion 428, and the container coupling protrusion 428 may be inserted into the insertion hole 625. The pivot hole 626 guides a rotation of the container connecting part 600 in a state where the container coupling protrusion 428 is inserted therein. A width of the pivot hole 626 is less than that of a section of the container coupling protrusion 428. Thus, the container coupling protrusion 428 may be hooked in a state where the container coupling protrusion 428 is inserted. For this, the pivot hole 626 has a predetermined curvature. When the container coupling protrusion 428 is fixed by a rotation of the container connecting part 600, the container connecting part 600 and the sub water supply container 420 are disposed in position.

The container-side passage 96 passing through the inside of the container connecting part 600 includes a connecting passage 97 and a suction passage 98. The suction passage 98 extends downwardly and is guided inside the water supply container 400 to suction the water within the water supply container 400. The connecting passage 97 is bent to connect an upper end of the suction passage 98 to the water feeding passage 94.

The suction passage 98 and the connecting passage 97 may be formed of the same material in one body. The suction passage 98 and the connecting passage 97 may be formed of materials different from each other as necessary. The connecting passage 97 may be formed of a plastic material such that the connecting passage 97 is inserted into the water feeding passage 94 and the suction passage 98.

Figure 13:
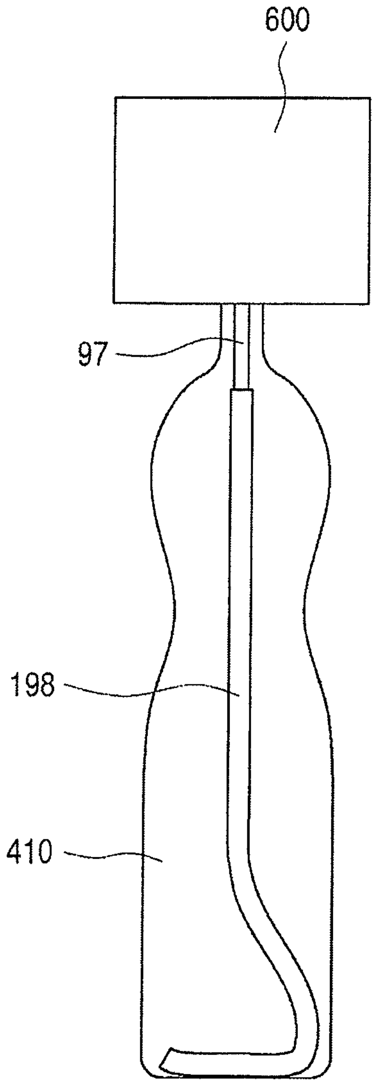
FIGS. 13 to 15 are front views illustrating various configurations of a suction passage according to the second embodiment.
Figure 14:
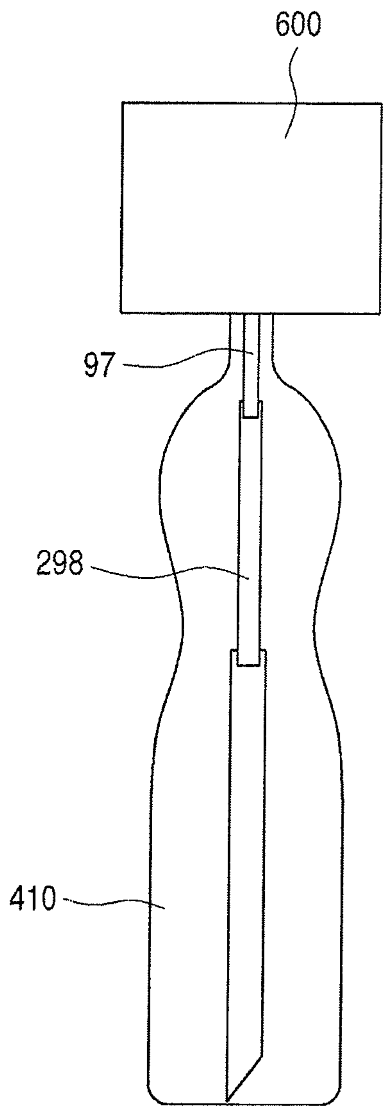
Figure 15:
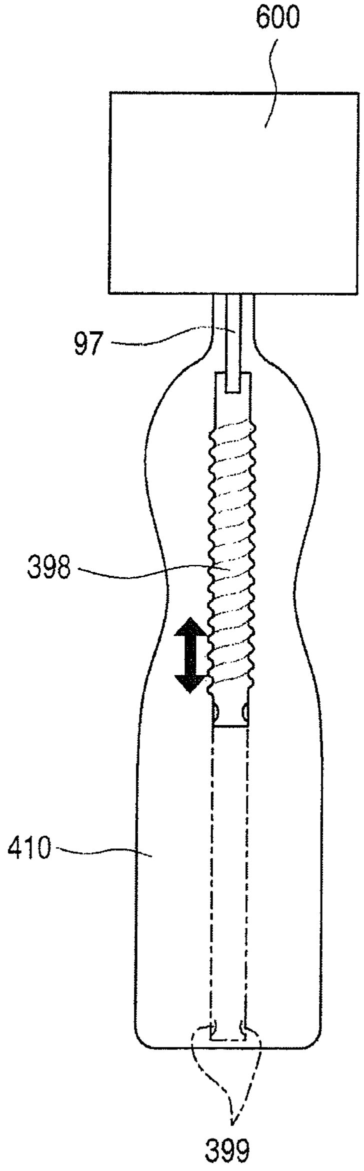

The suction passage 98 may be applied to the water supply container 400 having various sizes, and the suction passage 98 may have various structures as illustrated in FIGS. 13 to 15.

Referring to FIG. 13, a suction passage 198 may be formed of a flexible material. The suction passage 198 has a length corresponding to that of the inside of the basket 53 at a lower end of the container connecting part 600. Thus, the suction passage 198 can suction the water in an arrangement where the water supply container 400 has a maximum length. In an arrangement where the length of the water supply container 400 is short, the suction passage 198 can be curved by contact with a bottom surface of the water supply container 400.

Thus, the water is smoothly suctioned in an arrangement where the length of the water supply container 400 is short.

Referring to FIG. 14, the suction passage 298 may be extendable in stages. The suction passage 298 has a telescopic structure such as a structure of a telescope. Thus, a length of the suction passage 298 can be adjusted according to that of the water supply container 400. An opened end portion of the suction passage 298 is inclined. Thus, although the suction passage 298 reaches to the bottom surface of the water supply container 400, an entire surface of the opened end portion is not closely attached to the water supply container 400, so that the water may be suctioned smoothly.

Referring to FIG. 15, at least portion of the suction passage 398 has a bellows shape. As a result, the length of the suction passage 398 may be selectively adjusted according to the length of the water supply container 400. Thus, in an arrangement where the length of the water supply container 400 is long, the suction passage 398 is stretched to extend the length thereof. Also, in an arrangement where the length of the water supply container 400 is short, the suction passage 398 shrinks to shorten the length thereof. A suction hole 399 is formed around a lower end of the suction passage 398. Thus, although the suction passage 98 extends downwardly to contact a bottom surface of the water supply container 400 with the suction passage 98, the water may be smoothly suctioned through the suction hole 399.

Although the suction passage 298 having a telescopic structure has been shown with an opened end portion that is inclined, the open end thereof may instead include suction holes as shown in the suction passage 398 having a bellows shape. Conversely, although the suction passage 398 having a bellows shape has been shown with an open end including suction holes 399, the open end thereof may instead include an opened end portion that is inclined as shown in the suction passage 298 having a telescopic structure.

A guide protrusion 99 perpendicularly extending in left and right directions is disposed on an upper portion of the connecting passage 97. The guide protrusion 99 prevents the container-side passage 96 from being rotated or laterally moved during a relative vertical movement of the container-side passage 96.

A passage receiving part 640 is further disposed above the container inserting hole 622. A lower receiving part 642 providing a space capable of receiving the opening of the water supply container 400 is located at a lower end of the passage receiving part 640. A passage guide part 644 upwardly extending to receive and guide the container-side passage 96 is further disposed on a top surface of the lower receiving part 642.

The passage guide part 644 surrounds an outer surface of the container-side passage 96 to support the container-side passage 96. Also, the passage guide part 644 maintains a fixed position of the container-side passage 96 inserted into the passage inserting hole 534 of the housing 500 when the container-side passage 96 is moved upwardly and downwardly in a state where the container-side passage 96 is received therein. For this, a side guide part 645 (see FIG. 10) opened in left and right directions is disposed on the passage guide part 644. The side guide part 645 forms a space by ribs spaced a predetermined distance from each other and extends from an upper end to a lower end of the passage guide part 644.

The guide protrusion 99 is received inside the side guide part 645 and is guided thereby such that the connecting passage 97 is not rotated during an up-and-down relative movement of the connecting passage 97 by an up-and-down movement of the case 610.

A rear guide part 646 (See FIG. 10) opened in a rear direction is further disposed on the passage guide part 644. The rear guide part 646 receives and guides a portion bent in a rear direction of the connecting passage 97, and includes vertically disposed ribs spaced a predetermined distance from each other. The rear guide part 646 is disposed at a position corresponding to the through hole 614 of the case 610 and the passage inserting hole 534 of the housing 500. The rear guide part 646 guides a relative movement of the connecting passage 97 when the case 610 is vertically moved in a state where the container connecting part 600 is installed.

A spring 650 is disposed above the connecting passage 97. End portions of the spring 650 are in contact with an upper end of the connecting passage 97 and an inner surface of the case 610, respectively. The spring 650 elastically supports the case 610 and the connecting passage 97 so that the case 610 is supported in a state where an external force is not applied as well as in a state where a force is applied such that the container-side passage 96 is relatively moved in a downward direction.

A holder 800 for adjusting an opening percentage of the container inserting hole 622 is further disposed inside the container connecting part 600. The holder 800 fixes the water supply containers 400 having the various sized openings 412 inserted into the container inserting hole 622. The holder 800 may include a variable holder in which the opening percentage of the container inserting hole 622 is adjusted by the user's manipulation to restrict the various sized openings 412.

Figure 16:
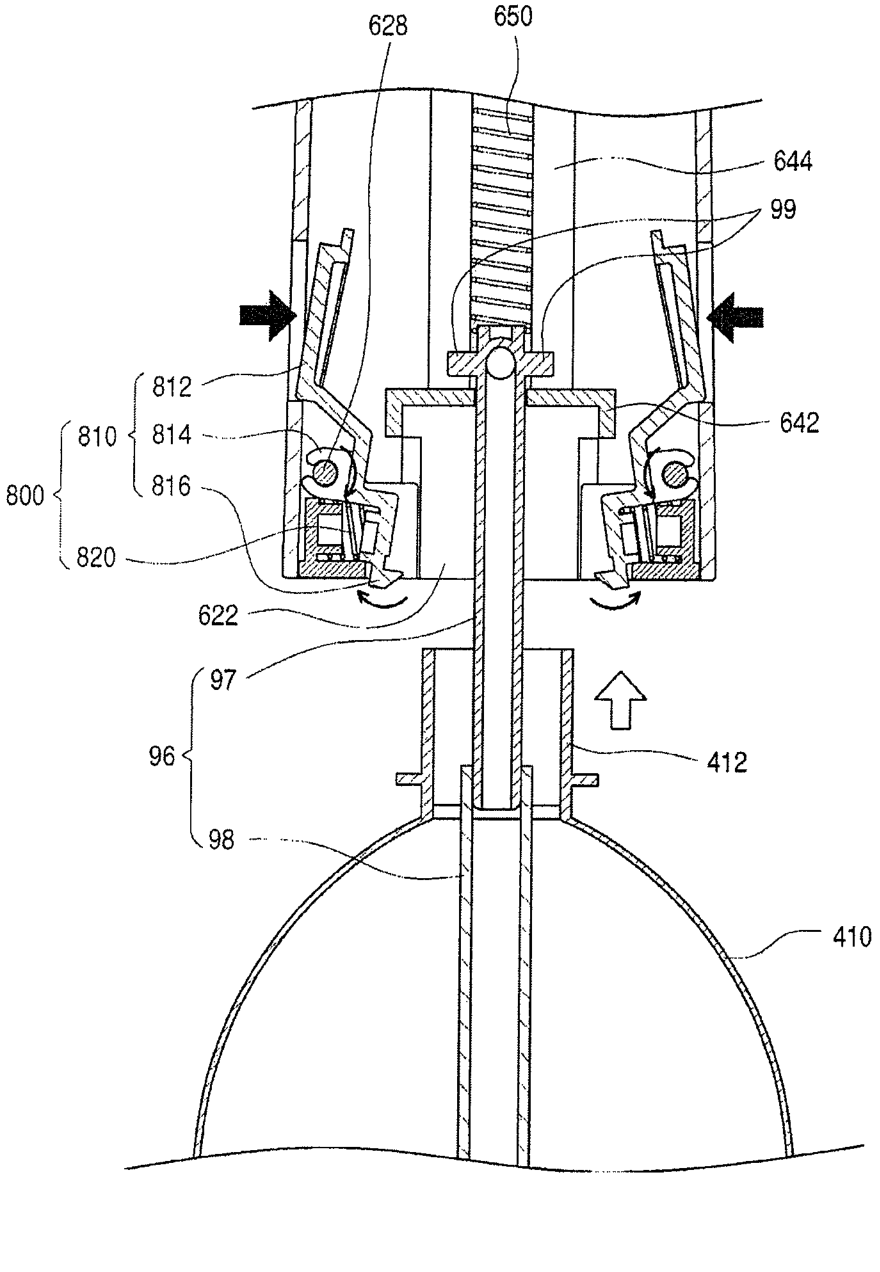
FIGS. 16 to 17 are front cross-sectional views illustrating an internal construction of the container connecting part according to the second embodiment.
Figure 17:
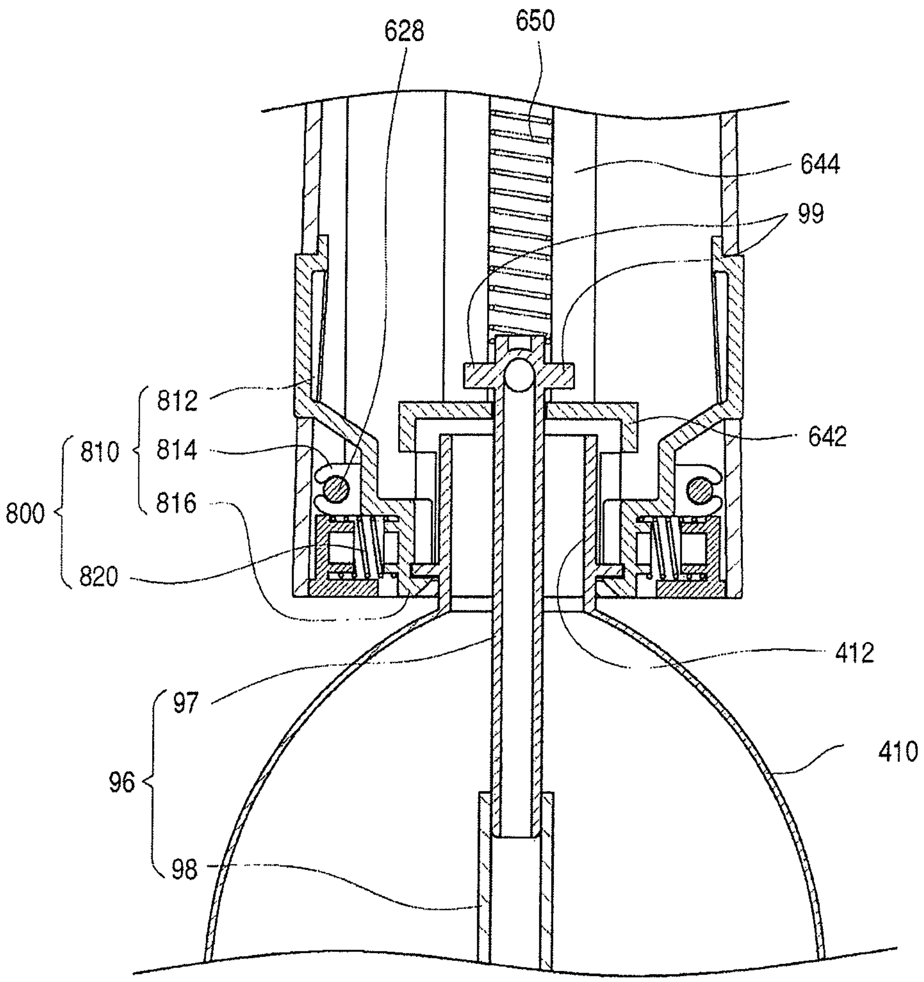

FIGS. 16 to 17 are vertical cross-sectional views illustrating an internal construction of the container connecting part 600 according to the second embodiment, and are cross-sectional views taken along line XVI/XVII-XVI/XVII of FIG. 12. Hereinafter, the holder 800 will be described in further detail with reference to FIGS. 11, 16 and 17.

Referring to FIGS. 11, 16 and 17, the holder 800 includes a detaching lever 810 and an elastic member 820. The detaching lever 810 is axially coupled to each of pivot support parts 628 disposed on both sides of the lower receiving part 642. The detaching lever 810 is pivoted by the user's manipulation, and protrudes in an inward direction of the container inserting hole 622 to adjust the opening percentage of the container inserting hole 622 according to the pivot manipulation.

In detail, the detaching lever 810 is bent several times, and a manipulation part 812 pressed by the user's manipulation is disposed on an upper portion thereof. The manipulation part 812 has a shape corresponding to that of the manipulation part exposing hole 612 disposed on a side surface of the case 610. The manipulation part 812 protrudes in an outward direction to expose the manipulation part 812 outside of the case 610. A coupling part 814 is disposed at an approximately central portion of the bent portion of the detaching lever 810. The coupling part 814 is axially coupled to the pivot support part 628 and becomes a pivotal center of the detaching lever 810.

A restriction part 816 is disposed on the bent lower end of the detaching lever 810. The restriction part 816 protrudes in the inward direction of the container inserting hole 622 through the opened portion of the lower receiving part 642 at the lower end of the detaching lever 810. The restriction part 816 is pivoted in the inward direction of the container inserting hole 622 according to the manipulation of the detaching lever 810 to press and restrict a side of the opening 412.

The restriction part 816 maximally protrudes in the inward direction of the container inserting hole 622 in a state where the detaching lever 810 is not pivoted. The restriction part 816 does not protrude in the inward direction of the container inserting hole 622 when the detaching lever 810 is maximally pivoted.

An inner surface of the restriction part 816 exposed through the container inserting hole 622 is inclined. That is, when the water supply container 400 is inserted, the opening 412 of the water supply container 400 is moved along the inclined portion of the restriction part 816. The restriction part 816 is inwardly inclined in an upward direction such that the restriction part 816 is smoothly moved in an outward direction.

The holder 800 may be manipulated in various methods in addition to the above-described pivot method of the detaching lever 810. For example, a plurality of plates such as an iris of a camera lens may be used as a structure for adjusting the opening percentage of the container inserting hole, and also, a horizontally movable restriction member may be used as a structure that can restrict the opening inside the inserting hole. In addition, it may be possible to use a structure in which two plates having long holes crossing each other are provided, and the opening is inserted, and then, the plates are rotated to restrict the opening.

Hereinafter, an operation of the refrigerator 2 including the above-described compositions according to this embodiment will be described. The user must supply water into the body 12 in order to utilize the ice making device 64 and the dispenser 68. For this, the user opens the refrigerating compartment door 52 of the refrigerator 2 and installs the water supply container 400 in the refrigerating compartment door 52.

In a situation where the installed water supply container 400 is the sub water supply container 420, the user fills the sub water supply container 420 with a desired drinking water, and then connects the sub water supply container 420 to the container connecting part 600. For this, the container coupling protrusions 428 are inserted into the container coupling holes 624, and the container connecting part 600 is rotated to completely restrict the container connecting part 600 and the sub water supply container 420.

The container inserting hole 622 of the container connecting part 600 communicates with the opening 426 of the sub water supply container 420 to guide the container-side passage 96 into the sub water supply container 420.

The container connecting part 600 coupled to the sub water supply container 420 is installed in the housing 500. At this time, the container-side passage 96 of the container connecting part 600 is connected to the water feeding passage 94 exposed toward the seating part 530 and installed on the seating part 530 by coupling the container coupling protrusions 428 to the container coupling holes 624. The restriction member 532 is pivoted and closely attached to the container connecting part 600 to complete the installation of the container connecting part 600.

On the other hand, in an arrangement where the installed container is the main water supply container 410, the user purchases a mineral water bottle generally available everywhere and opens the cap of the mineral water bottle to insert the opening 412 of the container into the container inserting hole 622 disposed in the container connecting part 600.

When the user presses the manipulation part 812 of the detaching lever 810, the container inserting hole 622 is completely opened by the pivot movement of the detaching lever 810. When the user removes a force pressing the manipulation part 812 after the opening 412 is inserted, the manipulation part 812 protrudes in the inward direction of the container inserting hole 622 to pressingly fix the opening 412.

In a situation where a diameter of the opening 412 is small, when the main water supply container 410 is moved upwardly without manipulating the manipulation part 812, the opening 412 is in contact with the inclined surface of the restriction part 816, and the detaching lever 810 is pivoted to restrict the opening 412 and the container inserting hole 622 after the opening 412 is inserted into the container inserting hole 622.

The container connecting part 600 is installed on the seating part 530 of the housing 500 in a state where the container connecting part 600 is coupled to the main water supply container 410. At this time, the end portion of the container-side passage 96 exposed through the container connecting part 600 is connected to the end portion of the water supply container 400 exposed toward the seating part 530. The first coupling part 538 of the housing 500 is coupled to the second coupling part 616 of the case 610. After the container connecting part 600 is coupled to the housing 500, the restriction member 532 is pivoted and closely attached to the container connecting part 600 to complete the installation of the container connecting part 600.

Since the main water supply container 410 installed in the container connecting part 600 is the mineral water bottle generally available everywhere, a capacity of the bottle may be varied, and thus, a length of the bottle may also be varied. Thus, for installing the main water supply container 410 having various lengths, an up-and-down height of the container connecting part 600 may be adjusted. That is, in a case where the container connecting part 600 is coupled to the main water supply container 410, and the container connecting part 600 is installed in the housing 500, the user vertically moves the case 610 by grasping the case 610 to adjust the height of the case 610. At this time, the case 610, the bottom plate 620, and the holder 800 may be adjusted in height to determine an upper position at which the main water supply container 410 is fixed.

The container-side passage 96 inside the container connecting part 600 is guided by the passage guide part 644 and is movable along the through hole 614 of the case 610 without restriction, and thus, a position installed on the housing 500 may be fixed. That is, while the fixed position of the container-side passage 96 is maintained, the case 610 is vertically moved to adjust the fixed position of the main water supply container 410. When the case 610 is vertically moved, the first coupling part 538 and the second coupling part 616 guide the movement of the case 610. Thus, the case 610 can be stably moved in upward and downward directions.

When the case 610 is moved to complete the installation of the main water supply container 410, the main water supply container 410 is supported at a lower end by the basket 53, and an upper portion of the main water supply container 410 is fixed by the container connecting part 600 to stably fix the water supply containers having various lengths.

The main water supply container 410 may be separated by reversely performing the above-described processes as necessary, and thus, the water supply container 400 can be reinstalled and replaced as necessary. Also, it is possible to simultaneously store the main water supply container 410 and the sub water supply container 420 in one basket 53. Thus, it is preferable that the sub water supply container 420 is used when water within the main water supply container 410 is exhausted.

In a situation where the water supply container 400 is completely installed to store sufficient water, when a signal for supplying water into the ice making device 64 or the dispenser 68 is generated, the pump 700 is driven. Due to the driving of the pump 700, the water stored in the water supply container 400 is suctioned through the container-side passage 96.

As illustrated in FIG. 8, in an arrangement where a filter 93 is disposed at the end portion of the container-side passage 96, the water is purified while the water passes through the filter 93, and then is suctioned through the container-side passage 96. The water suctioned through the container-side passage 96 passes through the water feeding passage 94 and the pump 700 and is supplied into the ice making device 64 and/or the dispenser 68.

In an arrangement where the switching valve 92 is disposed in the water supply passage 90, it may be possible to selectively supply the water into the ice making device 64 and the dispenser 68 according to the operation of the switching valve 92.

Hereinafter, a refrigerating compartment door 1052 according to a third embodiment will be described. Comparing this embodiment with the second embodiment, compositions of a housing 1500 and a container connecting part 1600 according to this embodiment are different from those of the second embodiment. Thus, differences therebetween will be mainly described, and the same parts will be described using the reference numerals and the descriptions of the second embodiment.

Figure 18:
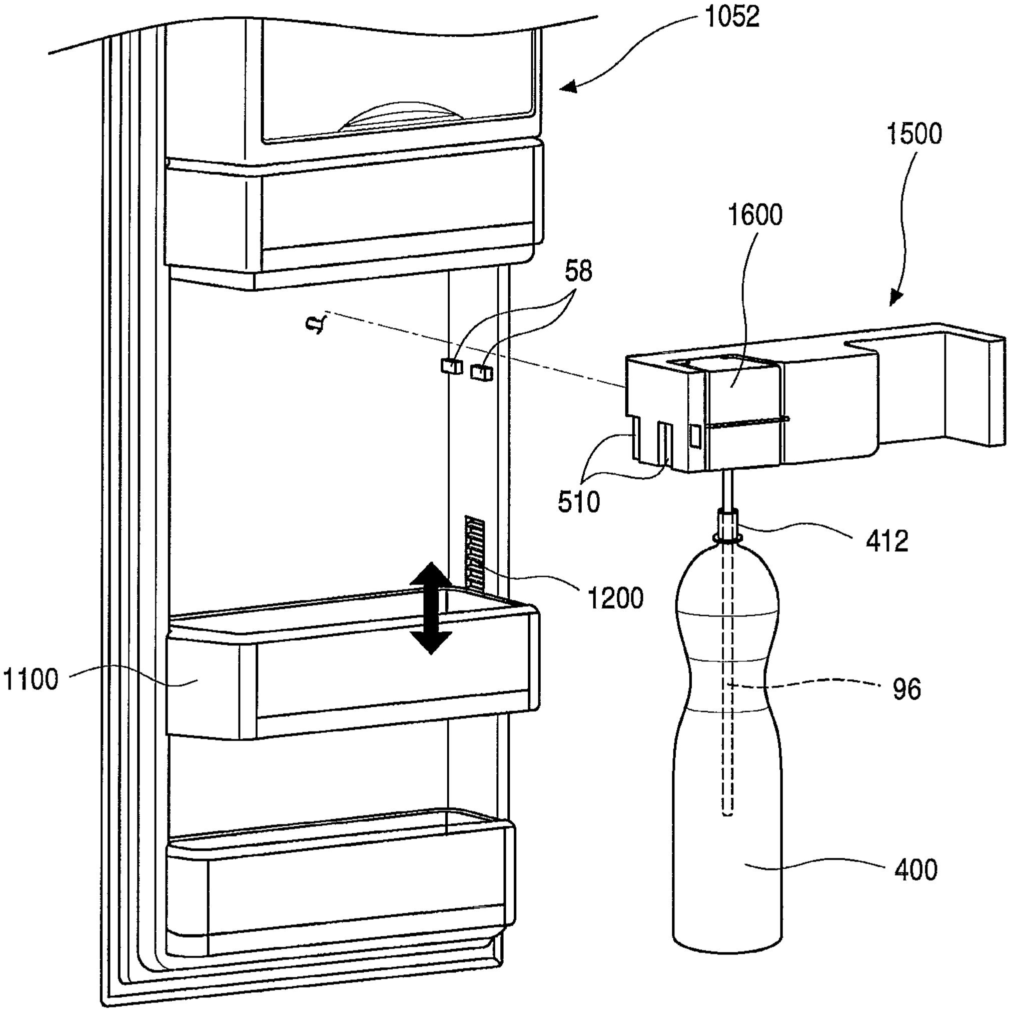
FIG. 18 is a perspective view of a refrigerating compartment door according to a third embodiment.

FIG. 18 is a perspective view of a refrigerating compartment door 1052 according to a third embodiment. A container connecting part 1600 is integrated with a housing 1500 as a single unitary component, and detachably installed on an inner surface of a refrigerating compartment door 1052. The container connecting part 1600 allows a water supply container 400 to be selectively detached. The water supply container 400 may be selectively fixed by a holder 800 as previously described.

The water supply container 400 may be a main water supply container 410 and a sub water supply container 420 as previously described. The container connecting part 1600 allows a main water supply container 410 and a sub water supply container 420 to be selectively installed.

Since the container connecting part 1600 is integrated with the housing 1500, a coupling position with the water supply container 400 is fixed. Thus, in a situation where a length of the water supply container 400 is changed, a support member 1100 is disposed below the container connecting part 1600 in order to support the water supply container 400.

The support member 1100 may have a shape similar to that of a basket 53. The support member 1100 is vertically moved along guide members 1200 disposed on both sides of the refrigerating compartment door 52. It may be possible to adjust heights of the support member 1100 and the basket 53 by adjusting installation positions thereof.

Thus, when the water supply container 400 is installed, the water supply container 400 is installed on the container connecting part 1600 disposed in the housing 1500, and the support member 1100 supporting the water supply container 400 is vertically moved to stably support the water supply container 400.

A variable support unit capable of adjusting a height of the support member 1100 may be disposed inside the support member 1100 as necessary. A height of the variable support unit may be adjusted using an elastic member or a screw. The height of the variable support unit is adjusted in a state where a position of the support member 1100 is maintained to support the water supply container 400 from the bottom.

Hereinafter, a refrigerating compartment door 2052 according to a fourth embodiment will be described. Comparing this embodiment with the second embodiment, a composition of a housing 2500 according to this embodiment is different from that of the second embodiment. Thus, differences therebetween will be mainly described, and the same parts will be described using the reference numerals and the descriptions of the second embodiment.

Figure 19:
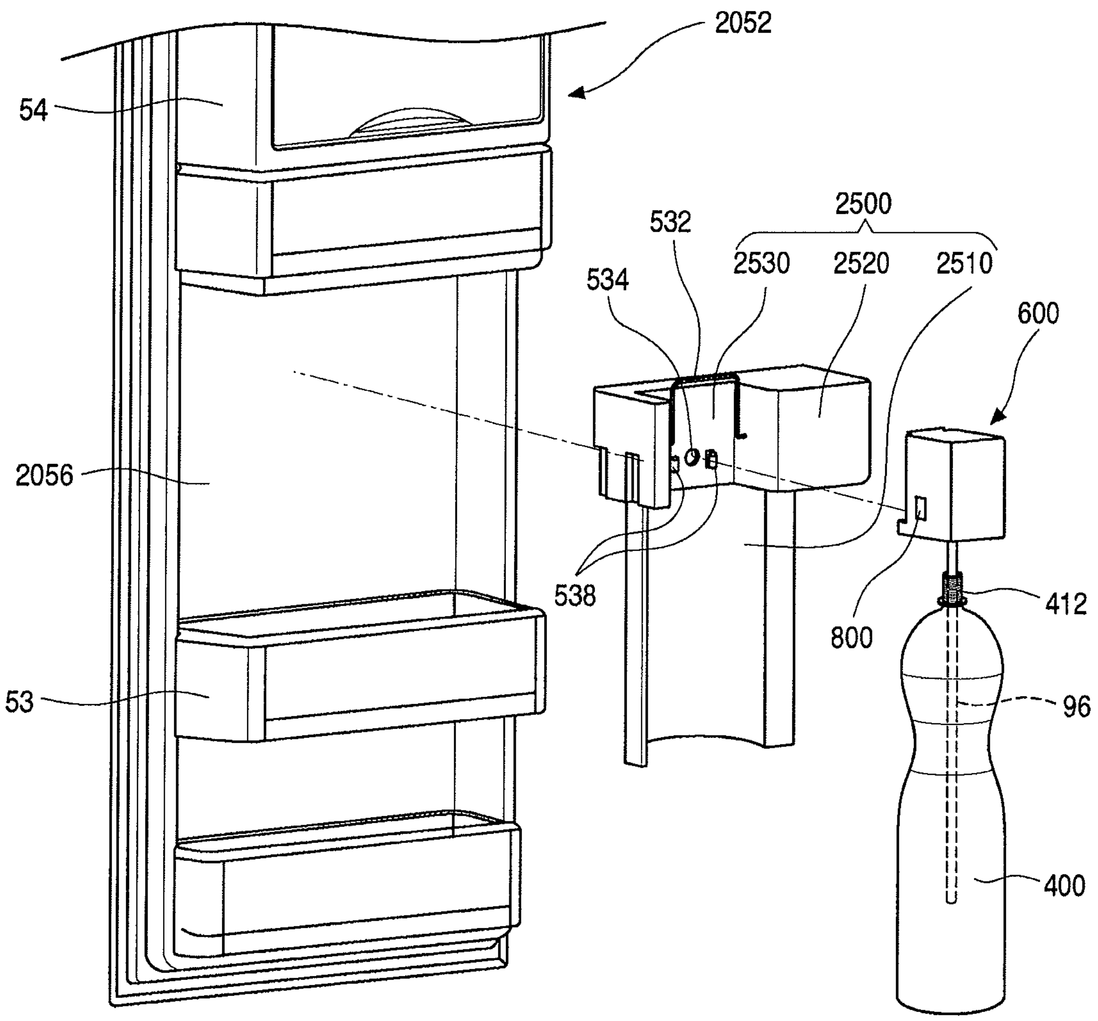
FIG. 19 is a perspective view of a refrigerating compartment door according to a fourth embodiment.

FIG. 19 is a perspective view of a refrigerating compartment door 2052 according to a fourth embodiment. A detachable housing 2500 is disposed inside a refrigerating compartment door 2052. The housing 2500 has a length corresponding to a length between a home bar 54 and a basket 53, and a horizontal width of the housing 2500 is less than that of a refrigerator 2.

The housing 2500 may be fixed by an additional coupling member such that the housing 2500 is closely attached to a door liner 2056 of the refrigerating compartment door 2052. The housing 2500 is modular such that the housing 2500 is used in common for a refrigerating compartment door 2052 of a refrigerator 2 without requiring a water supply container 400. That is, the housing 2500 includes a seating part 2530 on which a container connecting part 600 in which the water supply container 400 is selectively disposed is seated, a pump receiving part 2520 in which a pump as described in the previous embodiments is disposed, and a container seating part 2510 in which a portion of the water supply container 400 is received.

The seating part 2530 has a shape corresponding to that of the container connecting part 600. An opened end of a water feeding passage 94 extending toward a refrigerating compartment door 52 is exposed through a passage inserting hole 534 passing through the seating part 2530. A restriction member 532 for fixing the container connecting part 600 is disposed on the seating part 2530. A first coupling part 538 may be disposed to selectively couple the seating part 2530 to the container connecting part 600.

A container seating part 2510 extends downwardly from the seating part 2530 to surround the water supply container 400 in a length direction. Thus, when the water supply container 400 is installed, a condition in which a rear portion of the water supply container 400 is seated on the container seating part 2510 is maintained to prevent the water supply container 400 from being moved.

Hereinafter, a refrigerating compartment door 3052 according to a fifth embodiment will be described. Comparing this embodiment with the second embodiment, compositions of a housing 3500, a container connecting part 3600, and a pump 3700 according to this embodiment are different from those of the second embodiment. Thus, differences therebetween will be mainly described, and the same parts will be described using the reference numerals and the descriptions of the second embodiment.

Figure 20:
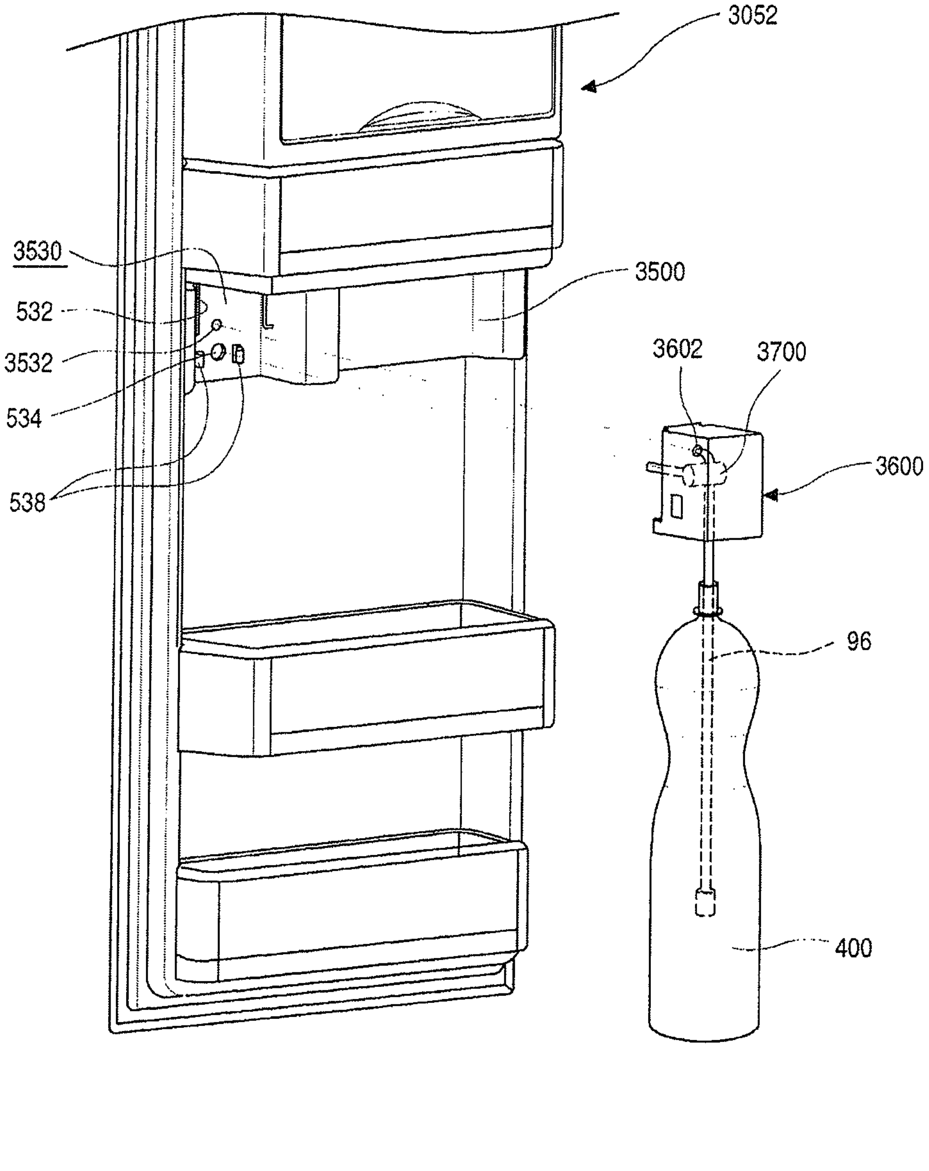
FIGS. 20 and 21 are perspective views of a refrigerating compartment door according to a fifth embodiment.
Figure 21:
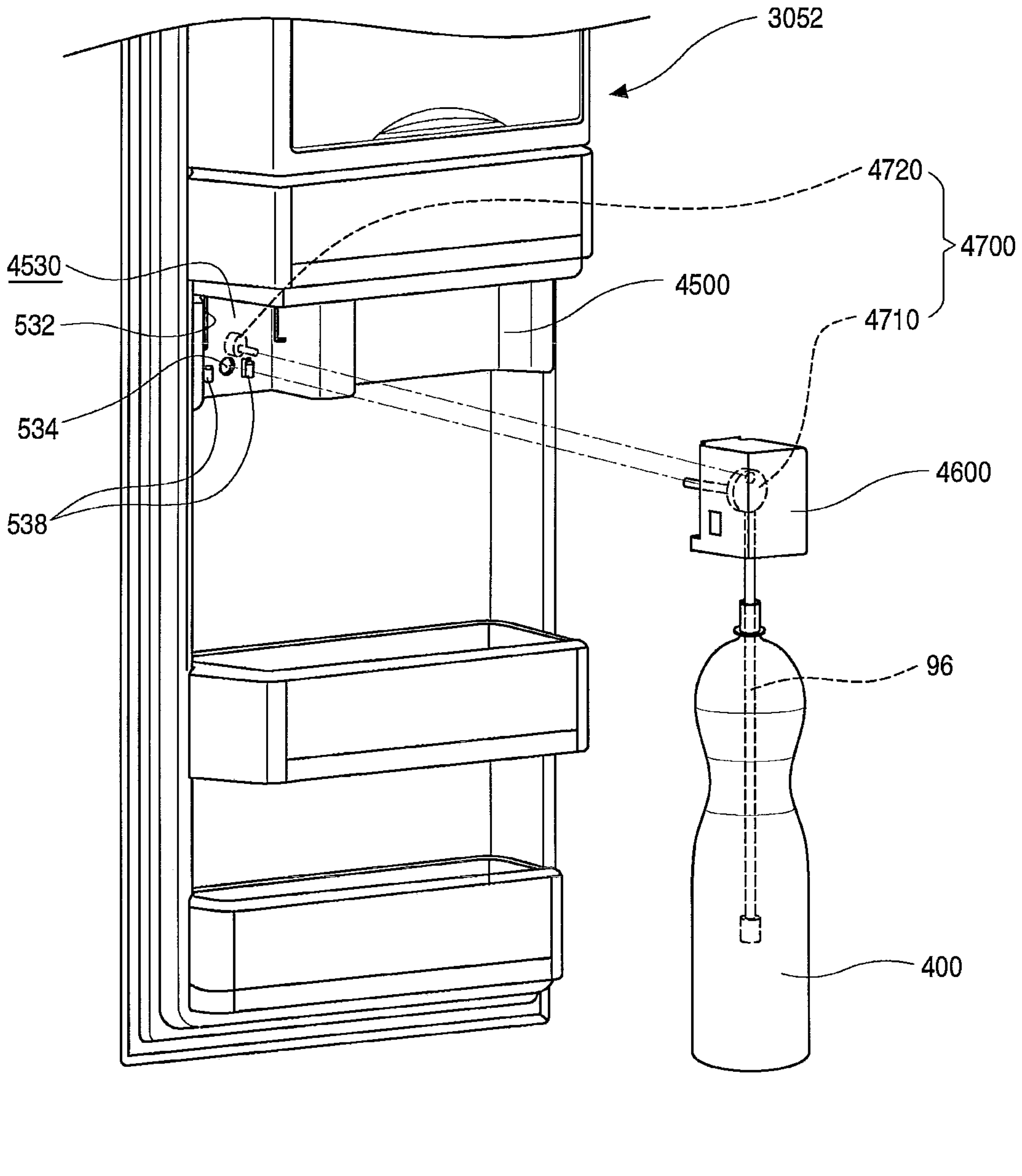

FIGS. 20 and 21 are perspective views of a refrigerating compartment door 3052 according to a fifth embodiment. Referring to FIGS. 20 and 21, a housing 3500 is provided in a module shape and is detachably disposed on an inner surface of a refrigerating compartment door 3052. A container seating part 3530 in which a container connecting part 3600 may be located is disposed in the housing 3500.

A passage inserting hole 534 and a first coupling part 538 are disposed in/on the container seating part 3530. When the container connecting part 3600 is attached, the container seating part 3530 is connected to a water feeding passage 94 and a container-side passage 96 to fixedly dispose the container connecting part 600.

At least portion of a pump 3700 is disposed in the container connecting part 3600. As illustrated in FIG. 20, an impeller and a motor constituting the pump 3700 are integrated, and the pump 3700 is disposed inside the container connecting part 3600. At this time, the pump 3700 communicates with the container-side passage 96.

Pump power connectors 3532, 3602 are respectively disposed on the container seating part 3530 and the container connecting part 3600. The pump power connectors 3532, 3602 transfer electric power for driving the pump 3700 when the container connecting part 600 is installed. A shape of the pump power connectors 3532, 3602 may have the same shape as that of a normal connector or contact terminal.

Referring to FIG. 21, an impeller 4710 constituting a pump 4700 may be disposed inside a container connecting part 4600, and a motor 4720 may be disposed inside a housing 4500. The impeller 4710 is connected to the container-side passage 96 inside the container connecting part 4600. A rotating shaft of the motor 4720 may be inserted into a rotation center of the impeller 4710. The motor 4720 is seated inside the seating part 4530, and the rotating shaft of the motor 4720 is exposed outside of the seating part 4530.

Thus, when the container connecting part 600 is installed, the water feeding passage 94 and the container-side passage 96 are connected while the container connecting part 600 is fixed. Also, the rotation shaft of the motor 4720 is inserted into the rotation center of the impeller 4710 to drive the impeller 4710.

Hereinafter, a refrigerating compartment door 5052 according to a sixth embodiment will be described. Comparing this embodiment with the second embodiment, compositions of a housing, a container connecting part 5600, and a pump 5700 according to this embodiment are different from those of the second embodiment. Thus, differences therebetween will be mainly described, and the same parts will be described using the reference numerals and the descriptions of the second embodiment.

Figure 22:
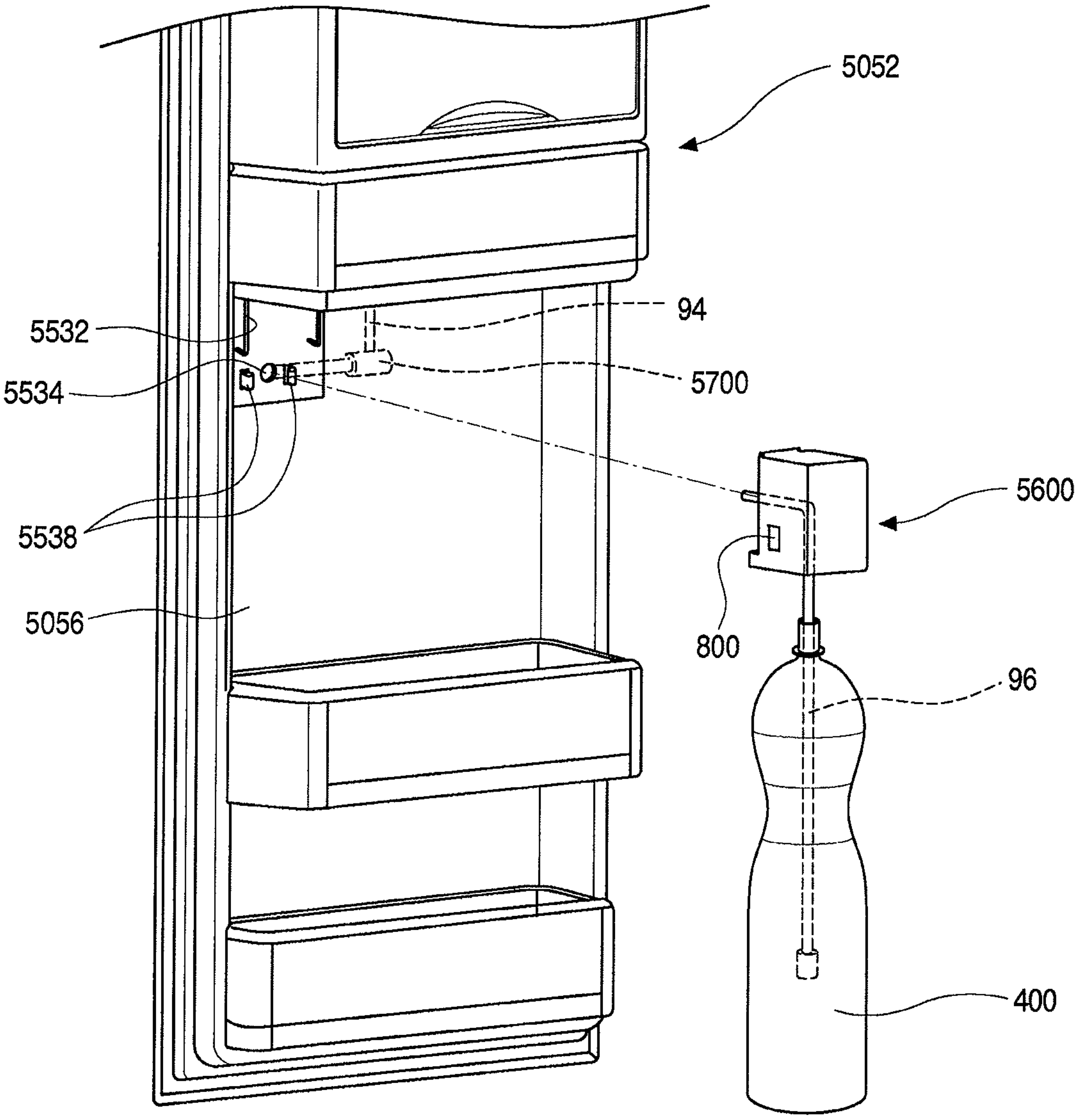
FIGS. 22 and 23 are perspective views of a refrigerating compartment door according to a sixth embodiment.
Figure 23:
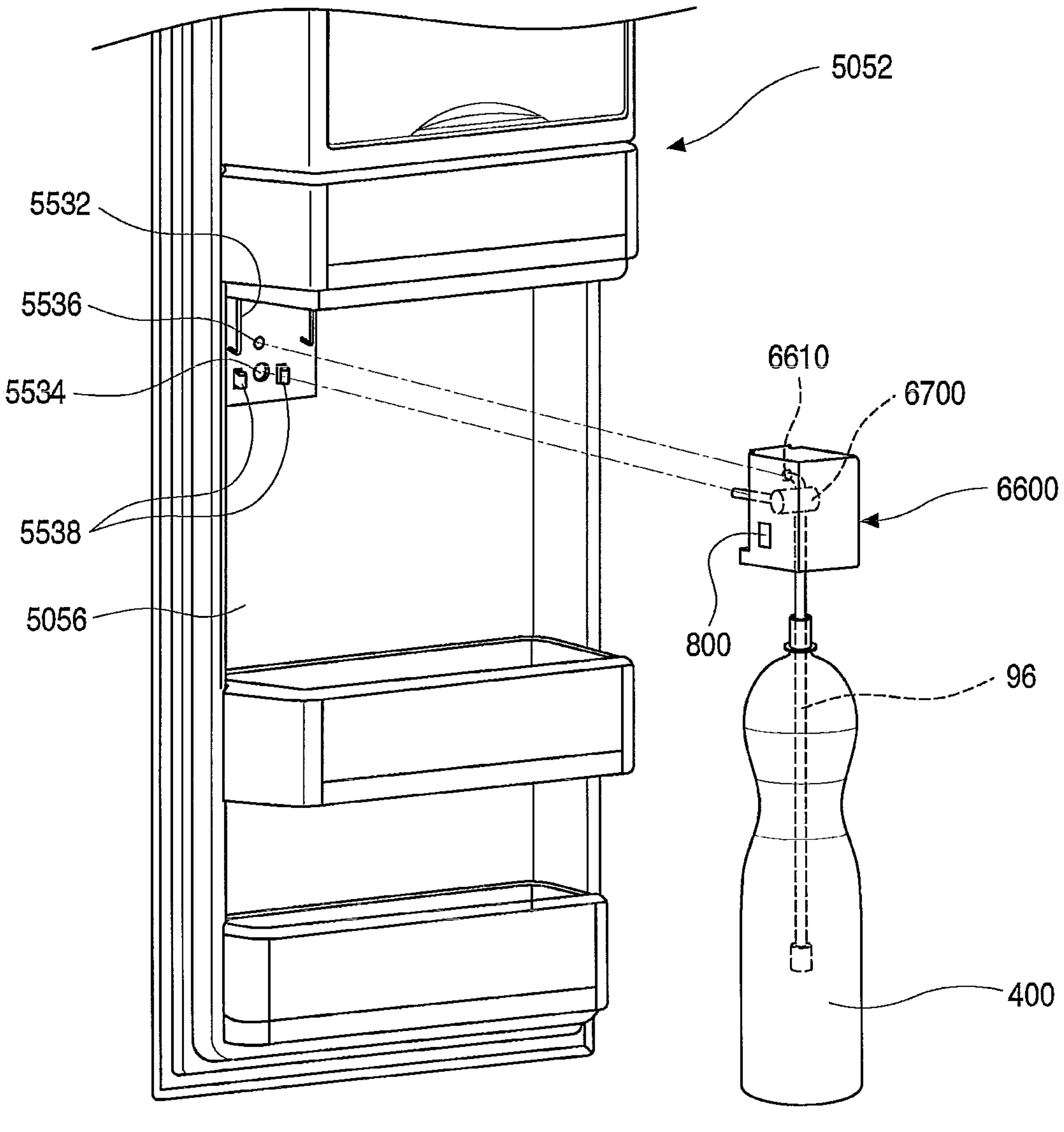

FIGS. 22 and 23 are perspective views of a refrigerating compartment door 5052 according to a sixth embodiment. A first coupling part 5538 for selectively coupling a container connecting part 5600 in which a water supply container 400 is selectively located is disposed on a refrigerating compartment door 5052. A passage inserting hole 5534 through which an end portion of a water feeding passage 94 is exposed is formed in a door liner 5056 of the refrigerating compartment door 5052.

A pump 5700 for pumping water from the water supply container 400 may be disposed in the refrigerating compartment door 5052 or the container connecting part 5600. Referring to FIG. 22, the pump 5700 may be built in the refrigerating compartment door 5052, and connected to the water feeding passage 94.

The container connecting part 5600 is selectively coupled to the first coupling part 5538. A container-side passage 96 is provided inside the container connecting part 600. The container-side passage 96 protrudes outwardly and may be connected to the water feeding passage 94.

Thus, a user manipulates a holder 800 to couple the water supply container 400 to the container connecting part 5600, and then the container connecting part 5600 is disposed in the refrigerating compartment door 5052. As a result, the container-side passage 96 is connected to the water feeding passage 94, and water within the water supply container 400 is suctioned by driving the pump 5700 inside the refrigerating compartment door 5052.

Referring to FIG. 23, a pump 6700 is disposed inside a container connecting part 6600. The pump 6700 communicates with the container-side passage 96. Pump power connectors 5536 and 6610 are disposed on an outer surface of the container connecting part 6600 and the door liner 56 corresponding to the outer surface of the container connecting part 6600, respectively. The pump power connector 5536 provides power for driving the pump 6700. A shape of the pump power connector 5536 may have the same shape as that of a normal connector or contact terminal.

A user manipulates a holder 800 to couple the water supply container 400 to the container connecting part 6600, and then the container connecting part 6600 is disposed in the refrigerating compartment door 5052. As a result, the container-side passage 96 is connected to the water feeding passage 94, and at the same time, the pump power connectors 5536 and 6610 are connected to each other to apply the power to the pump 6700. In such a condition, the water is supplied into an ice making device 64 and/or a dispenser 68 according to the user's manipulation.

Hereinafter, a refrigerating compartment door 6052 according to a seventh embodiment will be described. Comparing this embodiment with the second embodiment, a composition of a housing 7500 according to this embodiment is different from that of the second embodiment. Thus, differences therebetween will be mainly described, and the same parts will be described using the reference numerals and the descriptions of the second embodiment.

Figure 24:
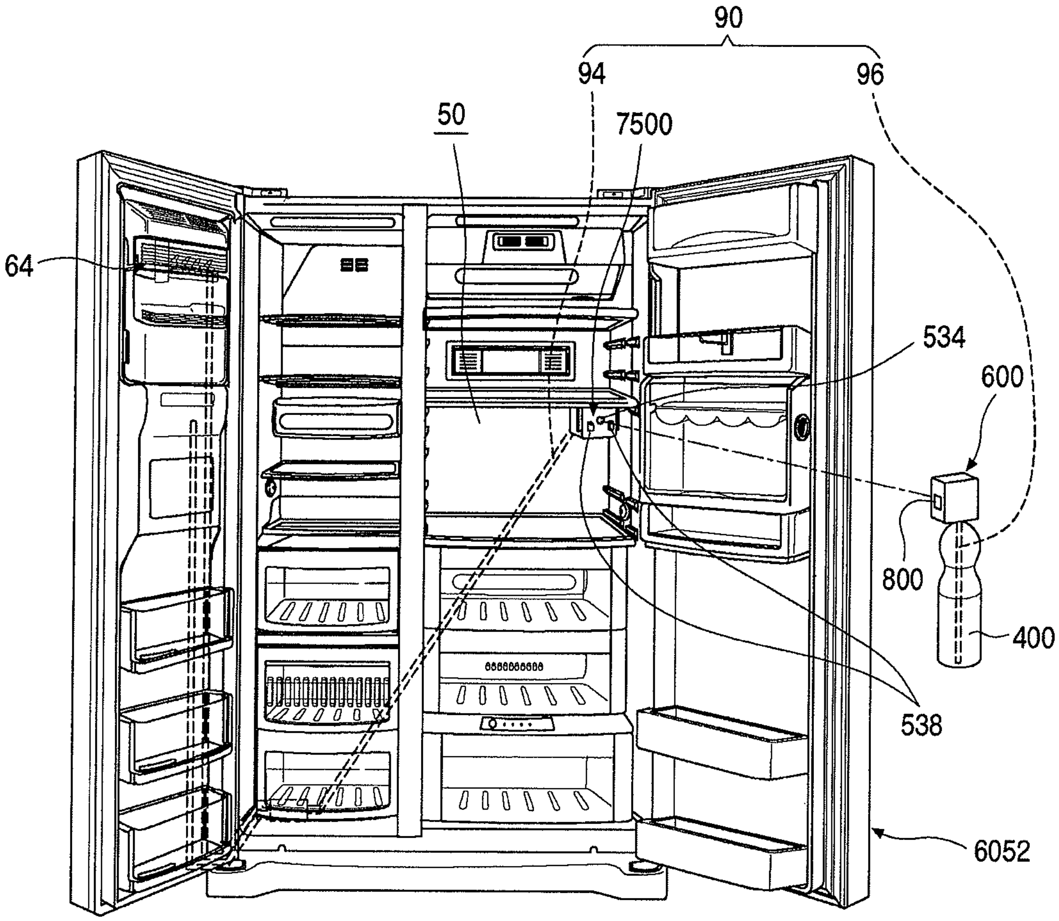
FIG. 24 is a perspective view of a refrigerating compartment door according to a seventh embodiment.

FIG. 24 is a perspective view of a refrigerating compartment door 6052 according to a seventh embodiment. Referring to FIG. 24, a housing 7500 is disposed inside a refrigerating compartment 50. A container connecting part 600 in which a water supply container 400 is selectively located is disposed in the housing 7500. The housing 7500 is disposed at a position at which the housing 7500 is in contact with at least one side surface inside the refrigerating compartment 50.

A pump as described in the previous embodiments is disposed inside the housing 7500, and the housing 7500 is provided in a module shape. The housing 7500 may be selectively disposed inside the refrigerating compartment 50 according to usage of the water supply container 400.

A passage inserting hole 534 through which the water feeding passage 94 is exposed is formed in a front surface of the housing 7500. A first coupling part 538 coupled to the container connecting part 600 is disposed on each of both sides of the passage inserting hole 534. A restriction member is further disposed in the housing 7500 to fix the container connecting part 600 by being closely attached to the container connecting part 600 due to a pivot movement.

A holder 800 is disposed on the container connecting part 600 to hold the water supply container 400. A container-side passage 96 passing through the container connecting part 600 may be connected to the water feeding passage 94 when the container connecting part 600 is disposed. The container connecting part 600 may allow a main water supply container 410 as well as a sub water supply container 420 to be disposed.

Thus, the water supply container 400 is disposed in the container connecting part 600, and the container connecting part 600 is coupled to the housing 7500 by a user to complete preparation for supplying water. The water within the water supply container 400 is supplied into an ice making device 64 and/or a dispenser 68 through the water supply passage 90 according to driving of the pump. The water may be selectively supplied into the ice making device 64 and/or the dispenser 68 by an operation of a switching valve 92.

Various arrangements and combinations of the several embodiments are contemplated by the present invention. For example, although various elements are described as being located in or on the refrigerating compartment door in the first through sixth embodiments, such elements may instead be located in the refrigerating compartment chamber as shown in the seventh embodiment.

Similarly, although the various arrangements of the suction passage shown in FIGS. 13-15 are described with reference to the second embodiment, such various arrangements of the suction passage may be used in any of the first through seventh embodiments. Further, although the various arrangements of the pump motor and impeller shown in FIGS. 20 and 21 are described with reference to the fifth embodiment, such various arrangements of the pump motor and impeller may be used in others of the first through seventh embodiments. Finally, although the various arrangements of the location of the pump shown in FIGS. 22 and 23 are described with reference to the sixth embodiment, such various arrangements of the location of the pump motor may be used in others of the first through seventh embodiments.

The invention being thus described, it will be apparent that the same may be varied in many ways. Such variations are not to be regarded as a departure from the spirit and scope of the invention, and all such modifications as would be apparent to one of ordinary skill in the art are intended to be included within the scope of the claims that follow.

What is claimed is:

1. A refrigerator comprising:

a body including a refrigerating compartment chamber and a refrigerating compartment door for opening and closing one side of the refrigerating compartment chamber;

an ice making device received in the body and configured to make ice;

a water supply container configured to store water to be supplied into the ice making device;

a water supply passage configured to guide the water from the water supply container to the ice making device;

a pump connected to the water supply passage to pump the water from the water supply container to the ice making device;

a housing separably disposed at one of the refrigerating compartment chamber and the refrigerating compartment door; and a container connecting part separably connected to an outer surface of the housing, the container connecting part including:

a space thereinside through which a part of the water supply passage passes; and a bottom surface having a container inserting hole through which the part of the water supply passage passes, wherein the water supply container is directly coupled to the container inserting hole such that an outlet part of the water supply container is upwardly directed, wherein the water supply container is directly coupled to the container connecting part at an outside position of the housing, and wherein at least a portion of the pump is disposed inside the container connecting part.

2. The refrigerator according to claim 1, wherein the pump is disposed inside the housing.

3. The refrigerator according to claim 1, wherein the housing includes a pump receiving part to receive the pump therein.

4. The refrigerator according to claim 1, wherein the housing is disposed on the refrigerating compartment door, and has a size corresponding to a width of an inner surface of the refrigerating compartment door.

5. The refrigerator according to claim 1, wherein the housing includes seating grooves disposed in both left and right sides thereof, and an inner surface of the refrigerating compartment door includes seating protrusions disposed on both left and right sides thereof, the seating protrusions being received in the seating grooves when the housing is disposed on the refrigerating compartment door.

6. The refrigerator according to claim 5, further comprising a basket including seating grooves disposed in both left and right sides thereof, the seating protrusions being received in the seating grooves when the basket is disposed on the refrigerating compartment door.

7. The refrigerator according to claim 1, wherein the housing includes:

a seating part depressed by a predetermined depth to receive the container connecting part; and a container seating part extending downwardly from the seating part to surround at least a portion of the water supply container.

8. The refrigerator according to claim 1, wherein the housing is disposed above the water supply container.

9. The refrigerator according to claim 7, wherein the housing includes a restriction member selectively restricting movement of the container connecting part in a state where the container connecting part is received in the seating part.

10. The refrigerator according to claim 1, wherein the container connecting part is configured to be detachable from the housing by vertical or horizontal movement.

11. The refrigerator according to claim 1, wherein the container connecting part is detachable from the housing in a state where the container connecting part is coupled to the water supply container.

12. The refrigerator according to claim 7, further comprising:

a first coupling part disposed at the seating part; and a second coupling part disposed at one side of the container connecting part, the second coupling part being selectively coupled to the first coupling part.

13. The refrigerator according to claim 12, wherein the first coupling part and the second coupling part are longitudinally disposed to guide a vertical movement of the container connecting part adjustment members configured to adjust a vertical installation height of the support member.

14. The refrigerator according to claim 1, wherein the body includes a freezing compartment, the freezing compartment including a freezing compartment chamber and a freezing compartment door for opening and closing one side of the freezing compartment chamber, the ice making device being located in the freezing compartment.

15. The refrigerator according to claim 1, wherein the water supply container is selectively one of:

a main water supply container having a first connection structure; and a sub water supply container having a second connection structure different from the first connection structure.

16. The refrigerator according to claim 15, wherein the container connecting part comprises one of or both:

a first coupling structure configured to couple the main water supply container to the container connecting part by engagement with the first connection structure; and a second coupling structure configured to couple the sub water supply container to the container connecting part by engagement with the second connection structure.

17. The refrigerator according to claim 16, wherein the first coupling structure of the container connecting part further includes a holder to selectively engage the first connection structure of the main water supply container to constrain the outlet part of the main water supply container within the container inserting hole of the container connecting part.

18. The refrigerator according to claim 17, wherein the holder includes first and second detaching levers provided inside of the container connecting part, the first and second detaching levers facing one another, each of the first and second detaching levers having a portion thereof in contact with the first connection structure of the main water supply container.

19. The refrigerator according to claim 18, wherein each of the detaching levers includes:

a manipulation part actuatable by a user to pivotally move the detaching lever, wherein the manipulation part is exposed to an outside of the container connecting part;

a restriction part extending in an inward direction of the container inserting hole to contact with the first connection structure of the main water supply container; and an elastic member, the elastic member generating an elastic force in a direction toward the first connection structure of the main water supply container.

20. The refrigerator according to claim 16, wherein the second coupling structure of the container connecting part includes a container coupling aperture formed in a bottom surface of the container connecting part, and wherein the second connection structure of the sub water supply container includes a container coupling protrusion protruding from a top surface of the sub water supply container, the container coupling protrusion being engagable with the container coupling aperture.

21. The refrigerator according to claim 20, wherein the first coupling structure of the container connecting part includes a container inserting hole configured to receive an opening member of the main water supply container, and wherein an opening in a top surface of the sub water supply container is located at a position corresponding to the container inserting hole of the container connecting part when the container coupling protrusion is inserted into the container coupling aperture.

22. The refrigerator according to claim 20, wherein the container coupling aperture has a curved shape having a predetermined curvature, and the sub water supply container is coupled to the container connecting part by a rotation operation after the container coupling protrusion is inserted into the container coupling aperture.

23. The refrigerator according to claim 20, wherein the sub water supply container comprises:

a container body for storing water;

a container cover in which the container coupling protrusion protrudes from a top surface thereof, the container cover covering an upper end of the container body; and a container handle protruding from the container body.

24. The refrigerator according to claim 1, wherein the water supply passage includes:

a water feeding passage into which water is fed;

a suction passage extending from the container connecting part to an inside of the water supply container, the suction passage having at an end portion a filter; and a connecting passage fluidly connecting the water feeding passage and the suction passage.

25. The refrigerator according to claim 24, wherein the water connecting passage and the suction passage are integrated in a one-piece unitary body or are separably coupled with each other.

26. The refrigerator according to claim 24, wherein the container connecting part is detachably disposed in the refrigerating compartment chamber or on the refrigerating compartment door, and the water feeding passage is selectively connected to the connecting passage according to attachment and detachment of the container connecting part.

27. The refrigerator according to claim 24, wherein one end of the connecting passage protrudes outside of the container connecting part and is inserted into the water feeding passage.

* * * * *